(12) United States Patent
Chornenky

(10) Patent No.: US 10,216,286 B2
(45) Date of Patent: Feb. 26, 2019

(54) ON-SCREEN DIAGONAL KEYBOARD

(71) Applicant: Todd E. Chornenky, Carmichaels, PA (US)

(72) Inventor: Todd E. Chornenky, Carmichaels, PA (US)

( * ) Notice: Subject to any disclaimer, the term of this patent is extended or adjusted under 35 U.S.C. 154(b) by 153 days.

(21) Appl. No.: 13/787,119

(22) Filed: Mar. 6, 2013

(65) Prior Publication Data

US 2013/0234949 A1 Sep. 12, 2013

Related U.S. Application Data

(60) Provisional application No. 61/607,155, filed on Mar. 6, 2012.

(51) Int. Cl.
*G06F 3/02* (2006.01)
*G06F 3/041* (2006.01)
*G06F 3/0488* (2013.01)

(52) U.S. Cl.
CPC .......... *G06F 3/0216* (2013.01); *G06F 3/041* (2013.01); *G06F 3/04886* (2013.01)

(58) Field of Classification Search
None
See application file for complete search history.

(56) References Cited

U.S. PATENT DOCUMENTS

| | | |
|---|---|---|
| 4,824,268 A | 4/1989 | Diernisse |
| 5,178,477 A | 1/1993 | Gambaro |
| 5,500,643 A | 3/1996 | Grant |
| 5,660,488 A | 8/1997 | Miller |
| 5,971,636 A | 10/1999 | Mensick |
| 6,084,576 A | 7/2000 | Leu et al. |
| 6,088,022 A | 7/2000 | Rakoski |
| 6,107,988 A | 8/2000 | Phillipps |
| 6,127,949 A | 10/2000 | Dodd |
| 6,132,118 A | 10/2000 | Grezeszak |
| 6,230,222 B1 * | 5/2001 | Rush ............... G06F 3/02 341/22 |
| 6,549,189 B1 | 4/2003 | Zarek |
| 6,802,662 B1 | 10/2004 | Cheng et al. |
| 6,919,879 B2 | 7/2005 | Griffin et al. |
| 7,220,069 B2 | 5/2007 | Griffin et al. |
| 7,227,536 B2 | 6/2007 | Griffin et al. |
| 8,095,879 B2 | 1/2012 | Goertz |
| 8,176,324 B1 * | 5/2012 | Krishnamurthy ............ 713/168 |
| 8,325,068 B2 | 12/2012 | Wong et al. |
| 8,344,915 B2 | 1/2013 | Satou et al. |

(Continued)

FOREIGN PATENT DOCUMENTS

WO WO 2011/137812 A2 * 11/2011 ............. G06F 3/041

*Primary Examiner* — Amir A Awad
*Assistant Examiner* — Donna V Lui
(74) *Attorney, Agent, or Firm* — AP Patents

(57) ABSTRACT

A keyboard includes rows of keys defining a keyboard axis and side borders of the keyboard, the keyboard axis disposed mediate the side borders of the keyboard, the rows of keys disposed in series with each other along the keyboard axis, and the keyboard axis being disposed at an acute or obtuse angle relative to a user of the keyboard and being generally aligned along a length of an arm of the user holding the keyboard. Each key may be also defined by a unique region of numeric values or a unique region of color pixels allowing ease in changing keyboard location, size and orientation.

3 Claims, 14 Drawing Sheets

(56) References Cited

U.S. PATENT DOCUMENTS

| | | |
|---|---|---|
| 8,345,008 B2 | 1/2013 | Lee et al. |
| 2003/0002007 A1 | 1/2003 | Meringer |
| 2003/0011503 A1 | 1/2003 | Levenson |
| 2003/0063070 A1 | 4/2003 | Kang |
| 2003/0095107 A1 | 5/2003 | Griffin et al. |
| 2004/0090417 A1 | 5/2004 | Amiri |
| 2004/0108994 A1 | 6/2004 | Kato |
| 2004/0190968 A1 | 9/2004 | Yang |
| 2005/0052419 A1 | 3/2005 | Burroughs |
| 2005/0058492 A1 | 3/2005 | Hirsch |
| 2005/0062723 A1 | 3/2005 | Tsai |
| 2006/0133881 A1 | 6/2006 | Osburn et al. |
| 2007/0086825 A1 | 4/2007 | Min |
| 2007/0159466 A1 | 7/2007 | Kawell et al. |
| 2007/0188464 A1 | 8/2007 | Lee et al. |
| 2007/0200828 A1* | 8/2007 | Skillman ............... G06F 3/0234 345/169 |
| 2007/0209024 A1 | 9/2007 | Lee et al. |
| 2007/0242047 A1 | 10/2007 | Griffin et al. |
| 2008/0012837 A1* | 1/2008 | Marriott et al. ............. 345/173 |
| 2008/0024327 A1 | 1/2008 | Downs et al. |
| 2008/0138136 A1 | 6/2008 | Sauvage et al. |
| 2008/0192410 A1 | 8/2008 | Kumar |
| 2008/0232891 A1 | 9/2008 | Macklin et al. |
| 2008/0297377 A1 | 12/2008 | Wang et al. |
| 2009/0189864 A1 | 7/2009 | Walker et al. |
| 2010/0052951 A1 | 3/2010 | Burrell, IV |
| 2010/0090872 A1 | 4/2010 | Satou et al. |
| 2010/0241985 A1* | 9/2010 | Kim et al. ...................... 715/773 |
| 2010/0251161 A1* | 9/2010 | Fong et al. ..................... 715/773 |
| 2010/0295793 A1* | 11/2010 | Srinivasan et al. ........... 345/173 |
| 2011/0015889 A1* | 1/2011 | Land et al. .................... 702/104 |
| 2011/0164184 A1* | 7/2011 | Avkarogullari ........ G06F 3/1431 348/571 |
| 2011/0238676 A1* | 9/2011 | Liu ........................... G01S 5/02 707/752 |
| 2011/0264442 A1* | 10/2011 | Huang et al. ...................... 704/9 |
| 2012/0042190 A1* | 2/2012 | Azar et al. ..................... 713/324 |
| 2012/0075194 A1* | 3/2012 | Ferren .......................... 345/168 |
| 2012/0092196 A1* | 4/2012 | Wang et al. ...................... 341/28 |
| 2012/0162078 A1* | 6/2012 | Ferren et al. ................. 345/168 |
| 2012/0200571 A1* | 8/2012 | Newell ................. G06F 3/1454 345/428 |
| 2012/0275642 A1* | 11/2012 | Aller et al. ..................... 382/100 |
| 2013/0135350 A1* | 5/2013 | Santos-Gomez et al. .... 345/649 |
| 2014/0082546 A1* | 3/2014 | Yang .............................. 715/773 |

* cited by examiner

Log taper ribbon gradient (actually exponential, but commonly called audio log taper)

(100%RGB - 100%R,0%G,0%B)    looks   Red  (use val=0xff-GreenVal (ex.) )

Angle A (shift angle) = Phi angle of average differences.

A is angle adjusted due to individual fingerprint-touch major axes angles all consistanlty averaging to a different angle than the target buttons' major axis average value.

ON-SCREEN DIAGONAL KEYBOARD

CROSS-REFERENCE TO RELATED APPLICATIONS

This application is related to and claims priority from U.S. Provisional Patent Application Ser. No. 61/607,155 filed on Mar. 6, 2012.

FIELD OF THE INVENTION

The present invention relates, in general, to keyboards and, more particularly, this invention relates to a diagonally oriented virtual or physical keyboards for mobile communication devices such as smart phones, pads, tablet computers and the like devices.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, keyboards, either generated on a touch screen in a virtual manner or provided by physical are used extensively with communication devices such as smart phones, pads, pagers, tablets and the like device as well as portable computers. To the best knowledge of Applicant all existing vertical and physical keyboards are oriented so that rows of keys are disposed parallel to one side of the device or are positioned in a left-to-right direction relative to a user of such device and/or keyboard. In other words, during use the left hand of the user is positioned at the left end of the keyboard while the right hand is positioned at the right hand of the keyboard. Furthermore, during use, the hands are angled toward the center of the keyboard and, therefore, the keys are engaged at an angle rather than straight on. Thus, in the existing keyboards, the fingers and hands typically must come from underneath, from towards the user's belly, or from the side, whereas the most comfortable position is instead leaving the arm and wrist in a straight line and in its comfortable position adjacent the torso, not out from the torso and not pressed against it as is needed to type on a keyboard directly parallel to the user or perpendicular the user.

The user of conventional keyboards cannot type with both hands and hold the keyboard securely, there are often periods of transition going between hands where it is not held securely at all.

In Portrait screen orientation, there is no good way for a standard keyboard to fill the screen with bigger keys if the keys are perpendicular and square with the bottom of the screen and the layout remains appearing like a known standard QWERTY keyboard.

The problem is more evident on smaller devices, such as phones and pagers, where thumbs are often the primary vehicles of engaging the keys. Due to the smaller size of the keyboard on these devices, typically the typing finger covers a large percentage of the keyboard, obscuring many/most of the keys and the location of the keys during typing effort.

Also, to the best knowledge of the Applicant, existing virtual type keyboards are provided in specific configurations and specific locations based on the coordinate system of the screen that they are disposed on.

Therefore, there is a need for improved virtual and/or physical keyboards that conforms to user's hand/finger and provides a more comfortable activation of the keys and wherein location of the virtual keyboards on the screen of the device can be modified by the user.

SUMMARY OF THE INVENTION

The invention provides a diagonally oriented and configurable on-screen virtual or physical keyboard. The key locations are preferably arc shaped to accommodate the user's finger/arm length, where the pivot point is around the finger or elbow for optimal ergonomics, so that a row of keys, and any chosen key within the row is accessible from only one axis of motion around the pivot point, and not requiring two separate coordinated motions such as pulling finger in and arcing/rotating finger over, to selectively access a key in the same row. In the arc configuration on a small handheld device such as a phone, it is easier for a single thumb of a user to reach all keys, than on a rectangular keyboard, enabling easier one-handed use and further enabling a far greater percentage of keys to be visible during the data entry effort.

The invention provides both the left and right hand keyboard configuration.

Further, using more screen space in the new invention, but being partially transparent makes each key bigger and makes it less likely for the user to type the wrong key accidently, increasing typing speed, especially for those with larger fingers, smaller screens or in a moving vehicle. The transparent nature simultaneously assures the application data in the screen underneath the keyboard remains visible and completely un-obscured, whereas the current screens are smaller but use a portion of the screen for keyboards, obscuring a portion of the receiving application. As the keys are large and diagonally disposed, they typically do not match the features of the application underneath them and are easy to visually differentiate from the application features and text underneath, allowing the application data fields to be read through the keys, depending on the degree of transparency chosen. Further, the fields in the application being filled in can be seen through the keyboard more easily, if desired, based on the transparency chosen.

The invention also provides a keyboard that can be readily adjusted to accommodate the user's hand/finger size, from a small child to a large adult. Presently preferred elliptical or oval shaped keys better conform to the finger-touch footprint than square keys typically found.

Further, to implement a keyboard or GUI which dynamically can change its' complex features' shapes and has a variety of possible user-adjustable configurations, the invention provides a simpler and better method that uses the typically low-order bits of the ARGB display screen to store and recall the specific key or action to be recalled/invoked when the key is pressed. This method is opposed to the current method of establishing a rectangle, (appropriate to rectangular keys) and using the LOCATION of the keypress rather than the ARGB VALUE underneath the finger/mouse press to select the key.

The invention also provides other enhancements related to this keyboard such as security enhancements in entering, storing and retrieving passwords, improved by the dynamic nature of the keyboard, which is also made possible by its feasible resize ability, allowing for additional keys to be placed in the keyboard when slightly adjusting the keyboard size downward to accommodate the new keys. Again, this can be done without obscuring the app underneath.

Because the size of the on-screen keyboard is large and transparent, areas for OCR or Barcodes can be located in the keyboard and not obscure the application underneath the keyboard.

OBJECTS OF THE INVENTION

It is, therefore, one of the primary objects of the present invention to provide a virtual or physical keyboard wherein keys are disposed in arced shaped rows.

Another object of the present invention is to provide a keyboard wherein the pivot point is aligned with a thumb, wrist or elbow for optimal ergonomics, so that a row of keys, and any chosen key within the row is accessible from only one axis of motion around the pivot point, and not requiring two separate coordinated motions such as pulling finger in and arcing/rotating finger over, to selectively access a key in the same row. The pivot point may also be between the wrist and elbow for example, allowing for minimal arc movement of each joint and both joints to reach the desired key in a specific row. This reduced arc sweep results in less stress and less total joint motion in its axis, the end result also being more comfort, less rotational acceleration and deceleration, and finally more comfortable, familiar and intuitive operation, the joint operating in a more commonly used range of angles.

Yet another object of the present invention is to provide a virtual keyboard with transparent keys assuring that the application data in the screen underneath the keyboard remains visible and completely un-obscured.

A further object of the present invention is to provide a virtual keyboard that can be adjusted in size and/or location.

Yet a further object of the present invention is to provide a method that uses the typically low-order bits of the ARGB display screen to store and recall the specific key or action to be recalled/invoked when the key is pressed.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
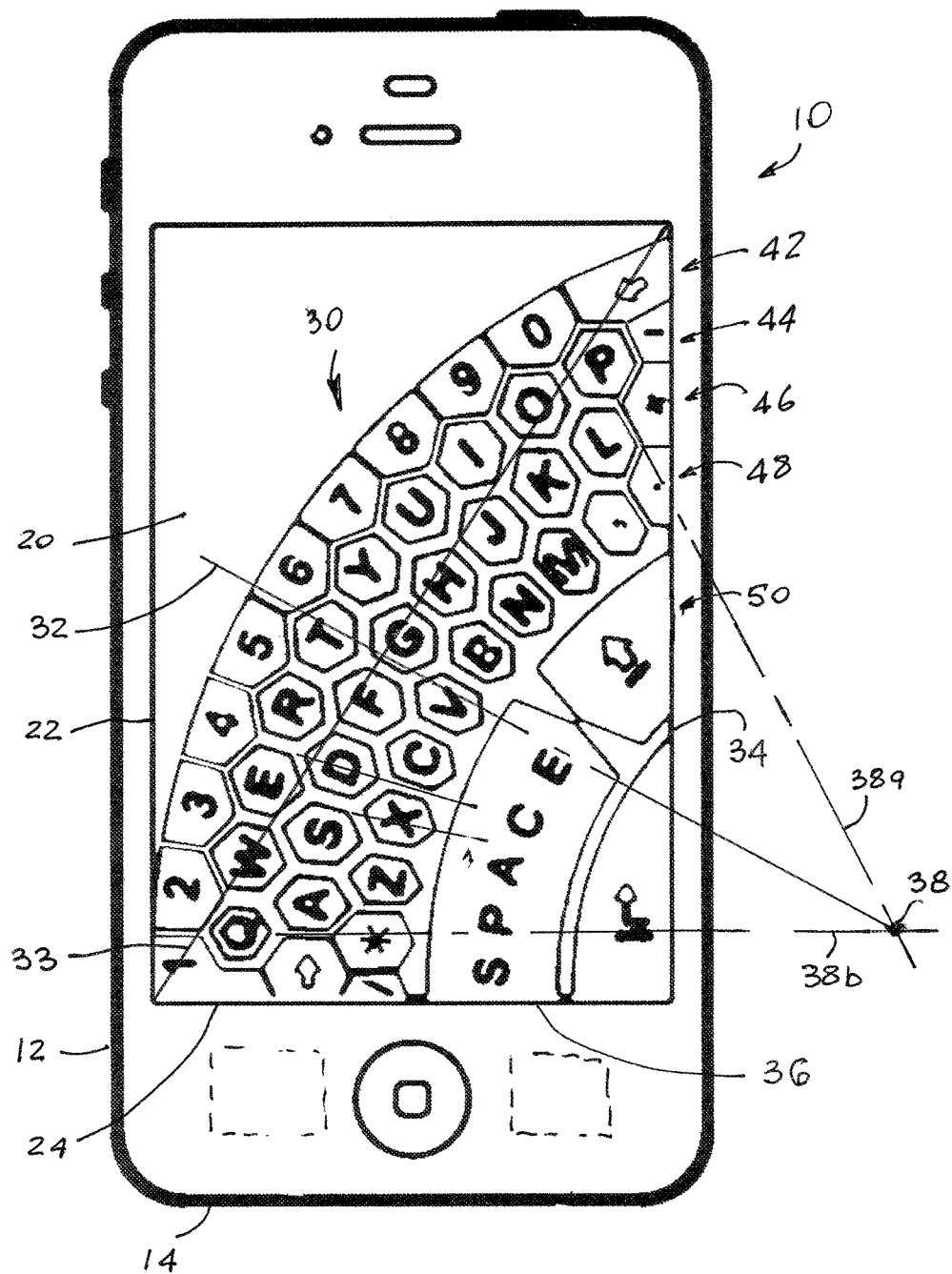
FIG. 1 illustrates a planar diagrammatic view of a keyboard of the instant invention disposed on a screen of a mobile communication device.

Prior to proceeding to the more detailed description of the present invention, it should be noted that, for the sake of clarity and understanding, identical components which have identical functions have been identified with identical reference numerals throughout the several views illustrated in the drawing figures.

The present invention is illustrated and described as a virtual keyboard in combination with a mobile communication device such as an IPhone, although it will be apparent to those skilled in the relevant art that the present invention may be applied to other mobile communication devices, such as a pager, a pad, a tablet and a hand held computer as well as a physical keyboard in either a standalone configuration or being integrated in any one of the above devices, and as such should not be interpreted as a limiting factor of the instant invention.

Now in reference to FIGS. 1-5 and in accordance with one embodiment, the invention provides a keyboard, generally designated as 30. The keyboard 30 is illustrated as being of a virtual type disposed on a screen 20 of a mobile communication device 10, such for example as an IPhone. Conventionally, the screen 20 is a quadrilaterally shaped surface defined by orthogonally disposed edges 22 and 24 that are conventionally aligned in a parallel spaced apart relationship with corresponding edges 12 and 14 of the device 10.

Figure 2:
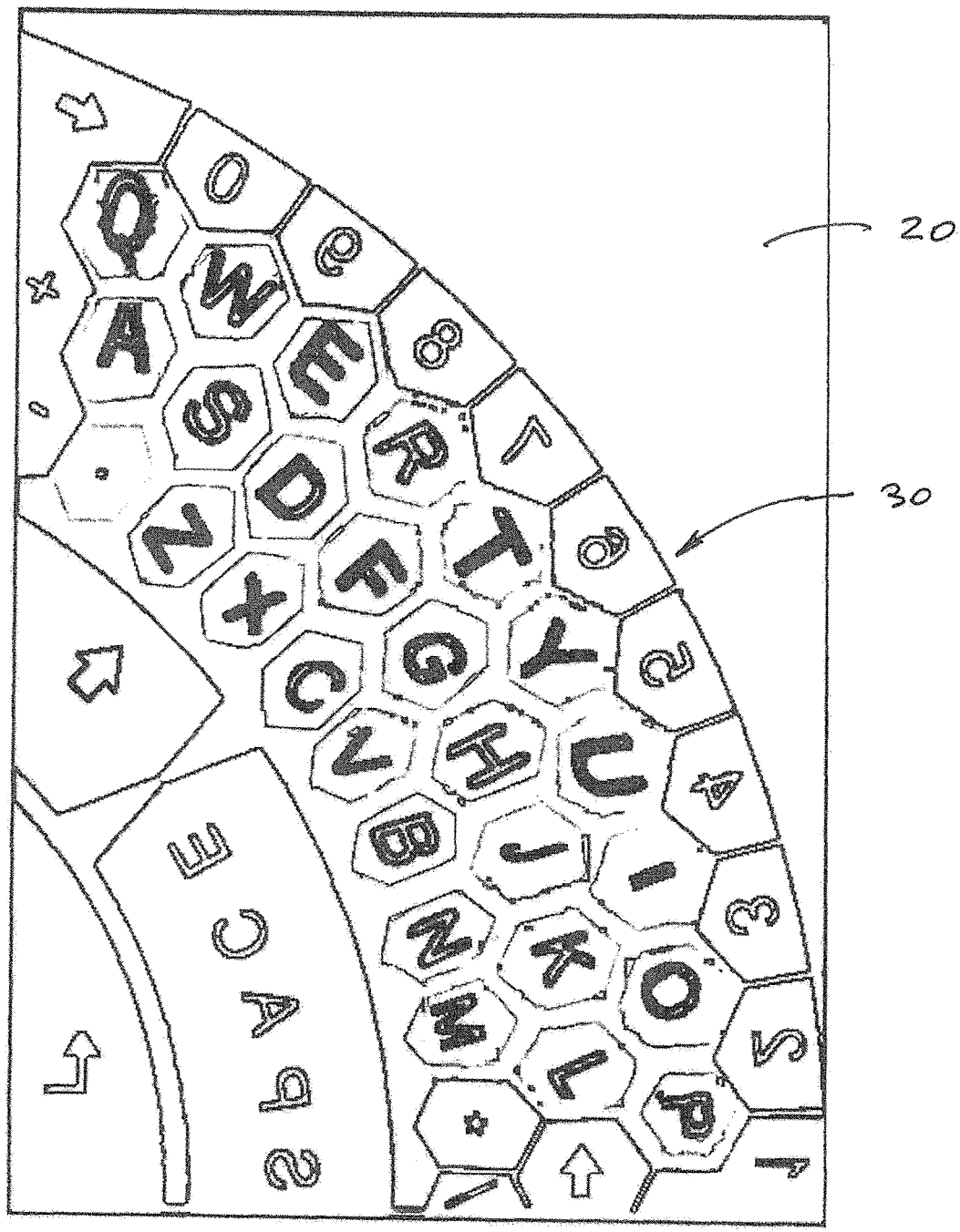
FIG. 2 illustrates the keyboard of FIG. 1 configured for left handed user with the keys being mirror imaged.
Figures 7, 8:
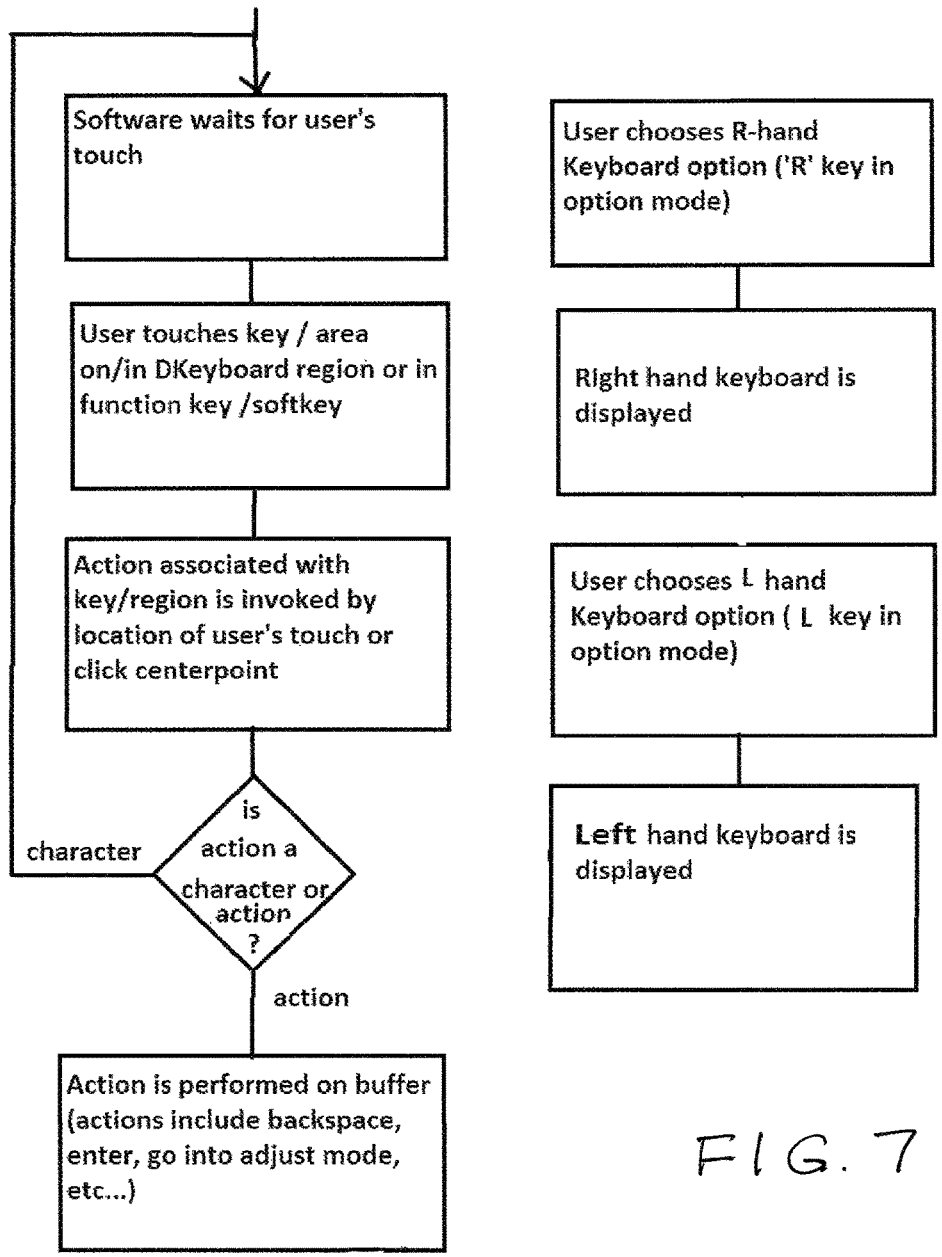
FIG. 7 illustrates a flowchart to generate the keyboard in either right hand or left hand configuration.
FIG. 8 illustrates a flowchart for key selection/action lookup means.

It would be appreciated that keyboard 30 is adapted for use by a right-handed and/or a left-handed user, with FIG. 2 illustrating a keyboard for use by a left handed user with the screen 20 being not only rotated ninety (90) degrees to orientation of the screen 20 of FIG. 1 but also is being a mirror image thereof. The instant invention contemplates that at least some letters can be reversed/swapped (Q with P, W with O, E with I, etc.). An exemplary method of selecting configuration is seen in FIG. 7.

Keyboard 30 includes rows of keys 40 defining a keyboard axis 32, keyboard diagonal 33 and side borders 34 and 36 of the keyboard 30. The diagonal 33 is preferably sized and oriented to span and efficiently and effectively utilize area between the opposite corners of the screen 20, hence defining the "diagonal" nature of the keyboard 20, wherein two corners thereof are generally aligned with the corresponding corners of the screen 20. The keyboard axis 32 is disposed mediate the side borders 34, 36 of the keyboard 30 and generally mediate the ends of the diagonal 33 thereof. Although, FIGS. 1 and 2 illustrate five (5) rows 42, 44, 46, 48 and 50 of keys 40, any other number of rows is contemplated herein. The rows 42, 44, 46, 48 and 50 of keys 40 are disposed in series with each other along the keyboard axis 32. Preferably, keys 40 in each row are being disposed in an arc shaped arrangement relative to the keyboard axis 32 and diagonal 33, as best shown in FIG. 1.

It is not essential for each key 40 to be defined by a distinct border and the instant invention contemplates that each key 40 may be represented by a color and/or shading in a borderless manner. Either each key 40 can be uniquely colored/shaded or a group of selected keys 40, for example all letters, can be defined by a different color/shading than the group of number keys.

An essential element of the invention is for the keyboard axis 32 to be disposed at an acute or obtuse angle relative to a user of the keyboard 30 and being generally aligned along a length of an arm of the user holding the keyboard 30 or the device 10. More specifically the keyboard 30 is so configured that the keyboard axis 32 runs through point 38 formed by intersection of the secondary axis 38a and 38b that are dependent on the position of keys "Q" and "P" in the conventional QUERTY keyboard. Furthermore, keyboard axis 32 is substantially aligned with a longitudinal axis within or near the arm of the user holding the keyboard 30 or holding the device 10 containing the keyboard 30 and wherein the side borders 34, 36 and the keyboard axis 32 intersect at point 38 generally aligned with a rotational joint within or near the arm. This pivot point could be the thumb joint in arm movement space constrained conditions; it could be the wrist, and or the elbow, or a location somewhere in between. A comfortable and accurate movement for some individuals in some space constrained situations would be a minimal arc movement of both elbow and wrist simultaneously, along the same arc and is considered to be the same axis. This combination of joint movements is sometimes preferred to only a wrist, elbow and/or thumb joint movement, often also in combination with a finger movement instead of the thumb.

It is presently preferred for the angle of the arc formed to be less than ninety (90) degrees, never passing from one quadrant to another, to accommodate a comfortable and limited range of angular motion while typing. In other words, an angle of tangent to the arc relative to the arc's center never substantially exceeds ninety (90) degrees or never goes below zero (0) degrees. It must be noted, that a circular or 270 degree keyboard would have most of its keys rather difficult to reach, with a great number of keys obscuring the screen 20.

Although FIGS. 1-2 describe side boarders 34, 36 being aligned with respective edges 22 and 24, the side borders 34, 36 may be spaced inwardly therefrom. In this arrangement, the keyboard axis 32 may be disposed generally diagonal to one corner of the quadrilaterally shaped screen 20.

Figure 3:
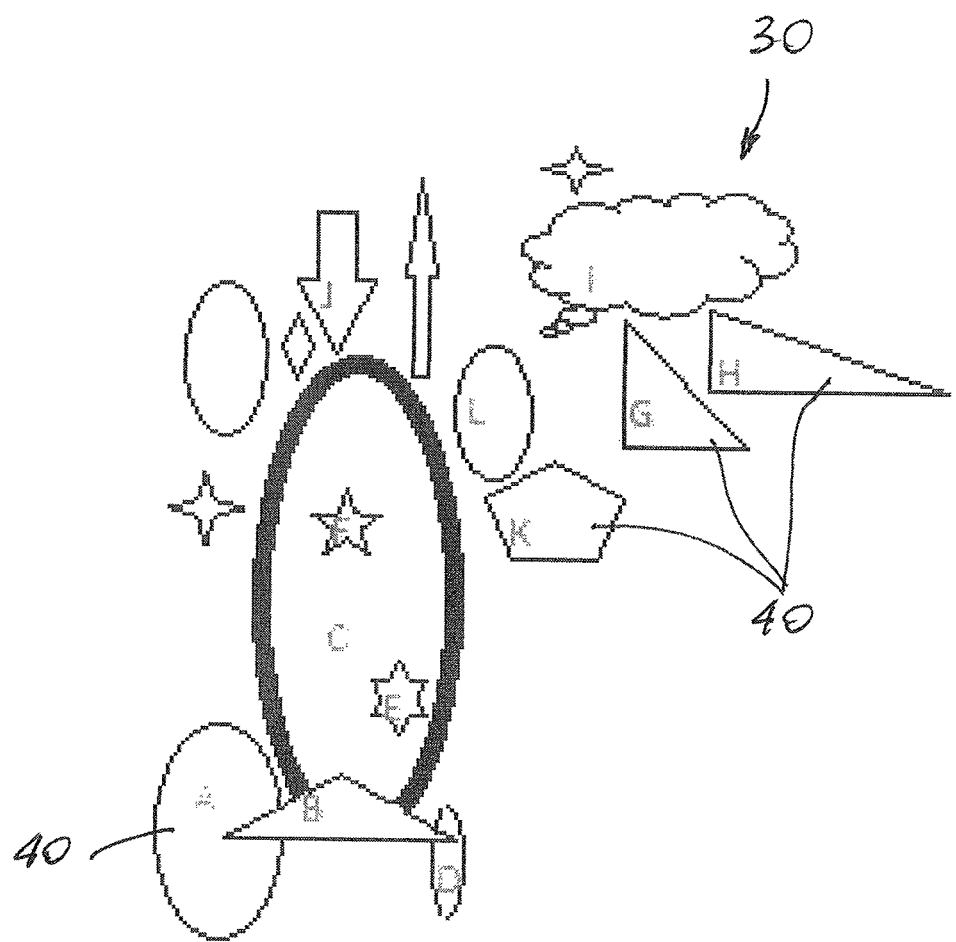
FIG. 3 illustrates various shapes of keys employed with the keyboard of FIG. 1.
Figure 4:
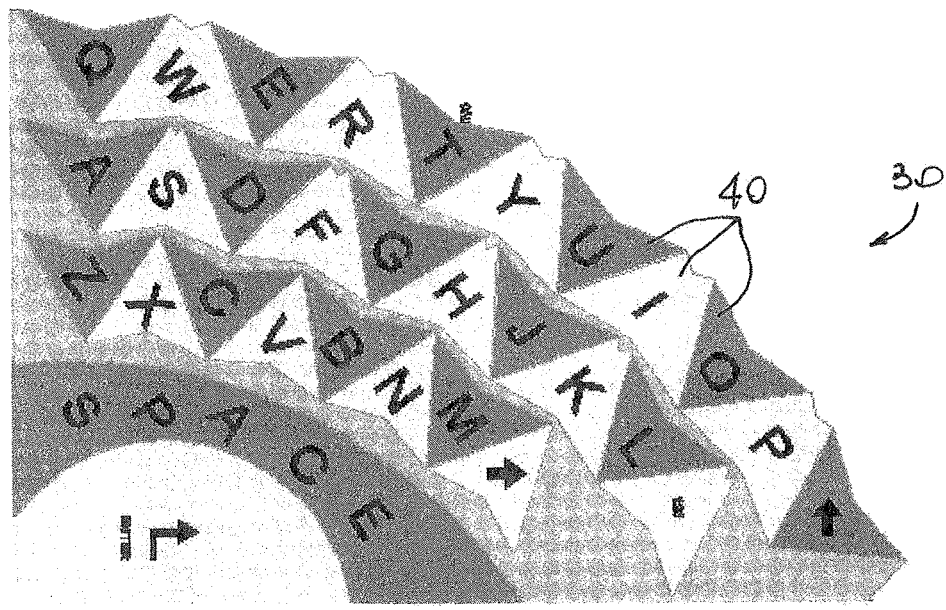
FIG. 4 illustrates the keyboard of FIG. 1 with generally triangular shaped keys.
Figure 5:
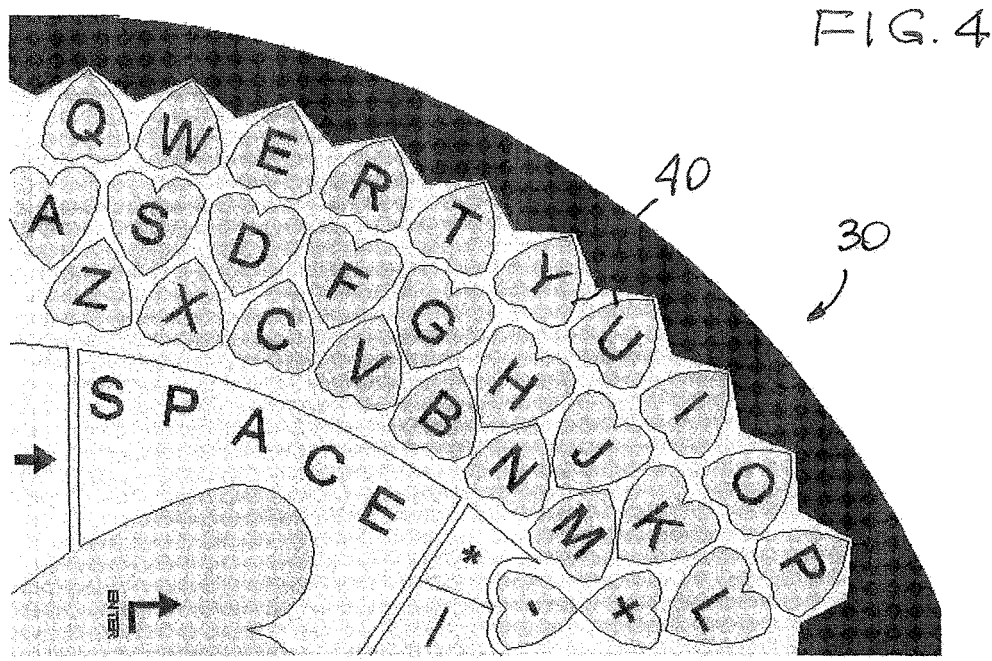
FIG. 5 illustrates the keyboard of FIG. 1 with generally heart shaped keys.

Although, the majority of keys 40 are shown as having a hex shape, the instant invention contemplates that key 40 can be of any shape represented, in a limited manner, by figures in FIG. 3. It is presently preferred for each key 40 within each row to have a length being greater than a width of the key and wherein keys 40 in at least half of the keyboard 30 further having a longitudinal axis thereof disposed at a unique angle to the keyboard axis 32 with all axis converging at the intersection point 38, typically outside the device and somewhere within or near the user's arm.

Furthermore, the representation of the keys 40 is at least one of semi-transparent, transparent, semi-translucent, translucent and opaque, depending on the application and type of the keyboard 30 with the keyboard 30 of a virtual type preferably adapted with keys 40 in a manner allowing to view text and/or images disposed below the keyboard 30.

It is contemplated that recently touched or pressed keys 40 are visually distinguished from other keys 40. Also, key size and/or appearance can be dynamically adjusted by a machine executable software code based on a probability of a next key 40 being selected and in further relationship to a previously selected key 40. It is to be further understood, that keys 40 of a virtual type can be added, changed or removed as well as a predetermined key 40 and/or combination of keys 40 is adapted to change operational mode of the keyboard 30.

Conventionally, the device 10 includes a processor 18 configured to translate each key 40 operated by the user into a machine executable software code. At least one of a location of the keyboard on the screen, key orientation, arc center location (typically offscreen), degree of arc, keyboard size, key representation, key configuration and key size is adjustable by the user and/or a machine executable software code executed by the processor 18 within the device 10. Furthermore, the processor 18 is configured to adjust keyboard size and/or maintain a size ratio between the screen 20 and the keyboard 30, so that the side boarders 34, 36 of the keyboard 30 do not extend beyond border edges 22, 24 of the screen 30. The keyboard 30 is further adapted to rotate in 90 degree increments based on accelerometer readings from the device 10, so that the keyboard axis 32 is positioned substantially diagonally away from the user.

Thus, the arc shaped rows 42, 44, 46, 48 and 50 are configured to ergonomically accommodate the user's finger/hand/wrist/arm length, where the pivot point 38 is around or somewhere between the finger, wrist or elbow, or an intermediate average location between them, for optimal ergonomics, so that a row of keys, and any chosen key within the row is accessible from only one axis of motion around the pivot point 38, and not requiring two separate coordinated orthogonal motions on different axis such as pulling finger in and arcing/rotating finger over, to selectively access a key in the same row. When held in one hand and typed with another, the keyboard is also thus optimized for use by multiple fingers and thumbs, more like conventional typing and can be done faster, with the closest finger reaching the desired key.

Processor 18 can be further programmed to send or transmit from the virtual keyboard's keys 30 a sensitive data such as passwords based on encrypted data stored in the keyboard associated software platform.

Figure 6:
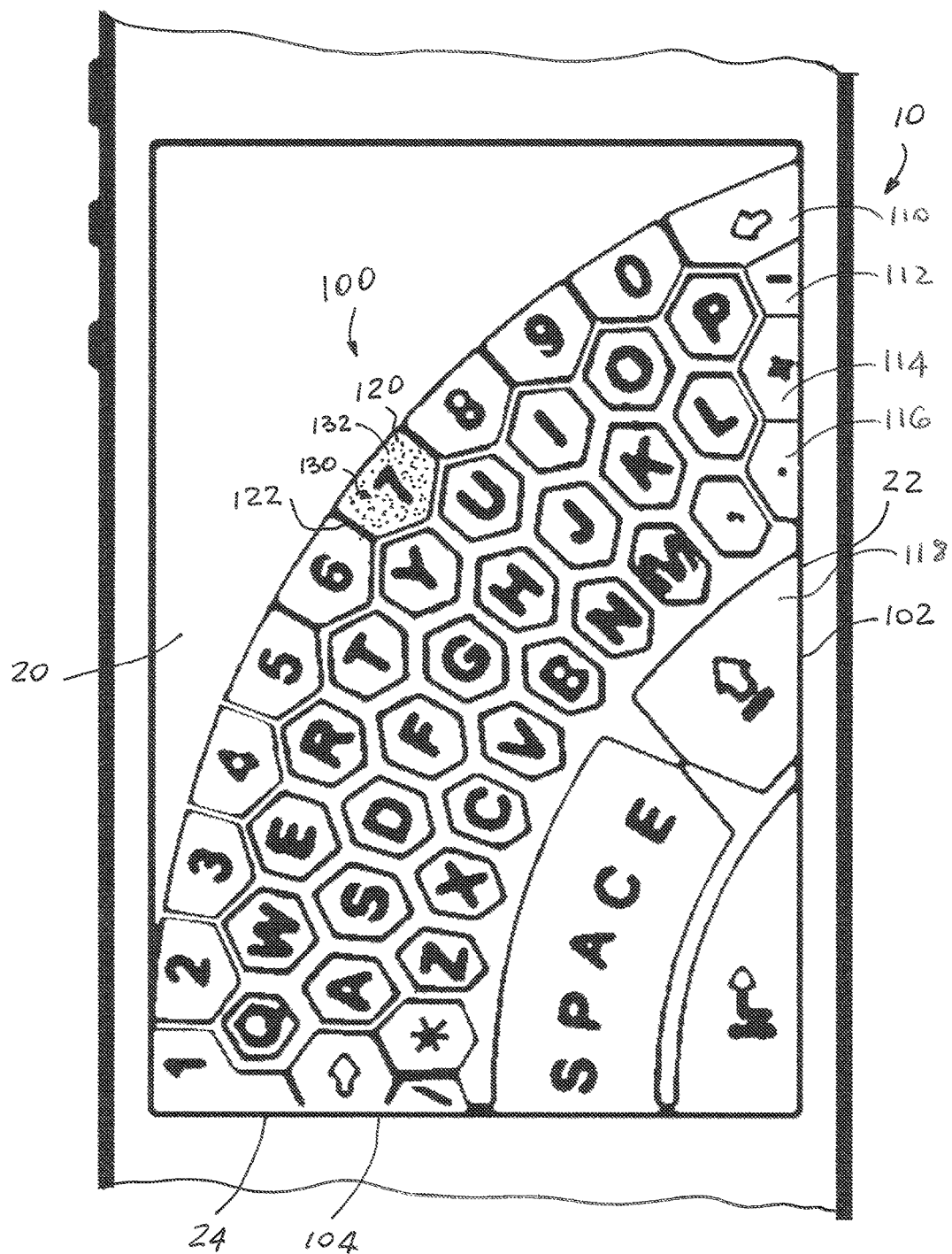
FIG. 6 the keyboard of FIG. 1, wherein each key is defined with a unique region of color pixels.

In another embodiment of FIG. 6, the instant invention also provides a keyboard 100 of a virtual type to be displayed on the screen 20 of the device 10. Keyboard 100 includes plurality of rows, shown as 110, 112, 114, 116 and 118, each containing a plurality of keys 120, wherein each key 120 is defined by a unique region 130 of color pixels 132. Furthermore, each key 120 is defined on the touch screen 30 by an icon 122. The processor 18 is configured to execute a predetermined logic algorithm so as to identify a numerical value of the each icon 122 being touched by a user or clicked on by way of a data entry device, such as a mouth or stylus (not shown) based on the unique region 130 of color pixels 132. Although the low order bits of color pixels 132 are conventionally indistinguishable from direct view of the user, each icon 122 may be displayed in distinct color/color pattern. More specifically, the processor is configured to decode ARGB color values, wherein only the lower-order bits are used to generate a numerical value representing a specific key 120 being touched and/or clicked.

The numerical value is stored in a memory if the device as an input for one or more actions to be performed. So, when the keyboard 100 is to be moved to a different location on the screen 20, the unique region 130 is coupled to the icon 122 during movement of the icon 122 to a different location on the screen 20. Furthermore, at least one icon 122 is defined in memory by a predetermined touch pattern configured to enact a predetermined action. By way of one example only of FIG. 10, keyboard 100 'Adjustment Command Entry mode' is entered by typing 'JJ' on keyboard ('JJ' is preferable due to central location, and as an example—as opposed to other more common identical duplicate characters typically found in English language words such as 'GG' in 'bagging', 'HH' in bathhouse, 'KK' in bookkeeper, etc.) The characters are not sent to the buffer used for the application program reading the final text generated from the keyboard. Other dedicated keys or areas may be used to enter "Adjustment mode" instead. It is important to note that activation of each key is recognized without use of coordinate system measurements.

In "Adjustment mode", the entire keyboard 100 can be adjusted/moved/resized/transparency-changed/etc. simultaneously or just its keys 120 by dragging for example the 'J' key around. When the side border 102 of the keyboard 100 hits the right edge of the screen 20 the keyboard 100 shrinks until the border and edge preferably no longer touch. The same action occurs when the side border 104 touches the bottom edge 24 in view of FIG. 6 or other edges touch, etc.

The processor 18 may be further configured and/or machine executable software code is further programmed so that:

1] The Keyboard 30 can be rotated +/−90 degrees automatically or manually by user if 1) device 10 (smartphone or tablet) rotates, (as sensed by the/its accelerometer) or 2) as desired manually-configured by keyboard 100 or separate button/smartkey/function-key commands if user holds tablet differently or an additional user will be using one of the keyboards (ex. from the other edge)

2] The spatial, operational, and/or separate user definable key configurations are all savable/restorable to permanent memory before startup or before closure of the keyboard 100.

3] The keyboard 100 is made bigger by touching a side border 102 and/or 104 with the user's finger while it is in select mode and dragging it outwards. Selection mode can be made evident by a flashing perimeter rectangle or other visual means.

4] The degree of arc of the keyboard 100 can be adjusted with a single value setting as seen in the source code.

5] In adjustment mode, '=57*24' (or other more complex math expressions) will perform the desired calculation in this mode, and display it within the keyboard 100 (typically in a keyboard 100 status line which may dynamically appear or always be there), without sending the characters to the keyboard 100 buffer and application program ('APP'). Optionally, it will also save the value in a soft key or global variable for later use. An alternative sequence to perform a calculation by entering a math expression without it getting into the keyboard buffer and app program of the keyboard 100 or device 10 could also be '==' or '===' or a different special key combination or dedicated function key or user input such as a voice command.

6] EXAMPLES OF SUB-COMMANDS once command mode is entered (using 'JJ' for example): —'H' displays the history buffer of entries made on the keyboard 100 recently, optionally also showing scrollbars in/adjacent the keyboard 100 to scroll thru the buffer. 'B'—selects barcode input source "G—selects Optical Character Recognition (OCR) input source—'E' encrypts the strings about to typed, later-encryption mode can be turned off by again typing 'JJ' and then typing 'E' (or other means, such as simply hitting 'enter'). The behavior can be software selectable. —'O' invokes further options or a separate option screen (foreign language fonts, other colors, adjust relative locations of individual keys 120 with other keys 120 and features within the keyboard 100, save/restore keyboard 30, 100 configuration, clear history buffer, etc.) 'M' emails the Keyboard 100's history buffer to the user's email address (optionally encrypted)—'L' changes keyboard 30, 100 to optimized for Left handed use (ex. 'Q' character starts in upper left hand corner and its associated keyboard 30, 100 row arcs down to the lower right corner of the keyboard 30, 100 rectangle, ending in 'P' in the lower right)—'R' changes keyboard 30, 100 to optimized for right handed use (See FIGS. 2 and 7) (example 'Q' character starts in lower left hand corner and its associated keyboard 30, 100 row arcs up to the upper right corner of the keyboard 30, 100 rectangle, ending in 'P' in the upper right)—'C' clears or factory-resets keyboard 100 location, size, etc. —'P' brings up previously typed strings (from history buffer) to be resent, edited, or modified and resent—'T' command to rotate keyboard 30, 100 −90 degrees—'Q' quit/close keyboard 30, 100, do not bring it up again automatically unless launched—'K' Security-Key entry for in-keyboard 30, 100 encryption/decryption—'V' Voice recognition input mode (instead of, or in addition to keyboard 30, 100) and its options (special softkey invocation, unusual key-sequence-invocation (such as 'XX'), use internal or external voice recognition software, etc.

7] 'G' OCR character recognition parameters input mode (instead of, or in addition to keyboard 30, 100) and its options (special softkey invocation, unusual key-sequence-invocation (such as 'OOO'), use internal character recognition software or send character image(s) to an external character recognition software/service which returns interpreted characters, etc., bring up a single line/cursor to be OCR'd or a whole camera rectangular region with many lines, etc.

8] The sub-functions in Adjustment Command Entry will be evident, seen as hint strings after the keys 120 on the keyboard 30, 100. For example, the 'B' key will have 'buffer' after it in smaller font—hinting to display the History Buffer.

9] Other standard built in keyboard 30, 100s (or user modifiable—from base configuration of keyboard 30, 100 can be displayed, examples include: —A large keyboard 30, 100 with all keys; uppercase keys, lowercase keys and all special characters simultaneously displayed on same keyboard 100 of 8-10 rows instead of the usual 4-5 rows on a typical 'QWERTY' keyboard 100. It is suitable for tablet computer with much display space. —A Numeric-only keyboard 30, 100—A Keyboard 100 with a function key that changes it to numeric-only keyboard 30, 100 and back—A Dvorak configuration keyboard 30, 100—A keyboard 30, 100 with function keys on bottom ad of top—A keyboard 30, 100 which always shows line of current character buffer on top. (See FIG. 8, for general keyboard 100 operation, applying to all these types of keyboard 100s.)—A keyboard 30, 100 which always shows line of current character buffer on bottom—A keyboard 30, 100 which allows only function keys to be hidden above top of keyboard 30, 100 and screen display, said function keys visible only when keyboard 30, 100 is dragged down from top.

10] The instant invention also contemplates that both left and right hand arced keyboards 100 (and/or 30) can be visible simultaneously, for use by the left and right hand from each side/corner of tablet.

11] A large magnified region of the keyboard 30, 100 directly under the user's finger where it is touching can be displayed in or around the keyboard 30, 100. If in the keyboard 30, 100, it can be displayed as a very transparent area overtop the keyboard 30, 100, as the finger moves its evident where the character's key is directly under the finger and hence invisible. This is especially important on small or complex keyboards 100. The user has the opportunity to move his/her finger to a more unambiguous location on the screen 20 before lifting the finger and choosing/sending character. This is a 'send-character on Touch up' type operation as opposed to sending the character when the finger first touches the key region. Thus, the finger may dwell for 100's to 1000's of milliseconds on a key 120, then slide over to another nearby correct key 120 before being lifted. Only the final location before the finger is lifted will be used to select the key generated and sent command. As the finger is dragged by the user to 'find' the correct location, the large magnified region moves accordingly, keeping the center of the finger-touch X,Y coordinate in its center and the surrounding magnified region and nearby key edges are thus evident.

12] Some visible graphics status indications (of current/past/recent operations/press—ex.) for the keys 120 include:

13] A white/colored circle can appear around the most recently pressed key 120, indicating events.

14] A transparency change/fade effect which changes the appearance of a key 120 gradually back to its default appearance from a sudden new appearance state (ex. Lighter) directly after a key press, indicating which keys 120 were pressed recently and also the order in which they were pressed. A user typing quickly would have and see several keys 120 simultaneously changing back to their default visual state, the most recent would be, for example, the lightest; the least recent would be, for example, the closest to normal appearance. For example the key's background color gets lighter when pressed and linearly fades to the same color as the other keys 120 over a 5 second span or any other intervals. Other changes may include: a color change, a brightness change, a size change or a shape change.

15] All temporary status changes are/can be reset when The user hits the enter key.

Figures 11, 12:
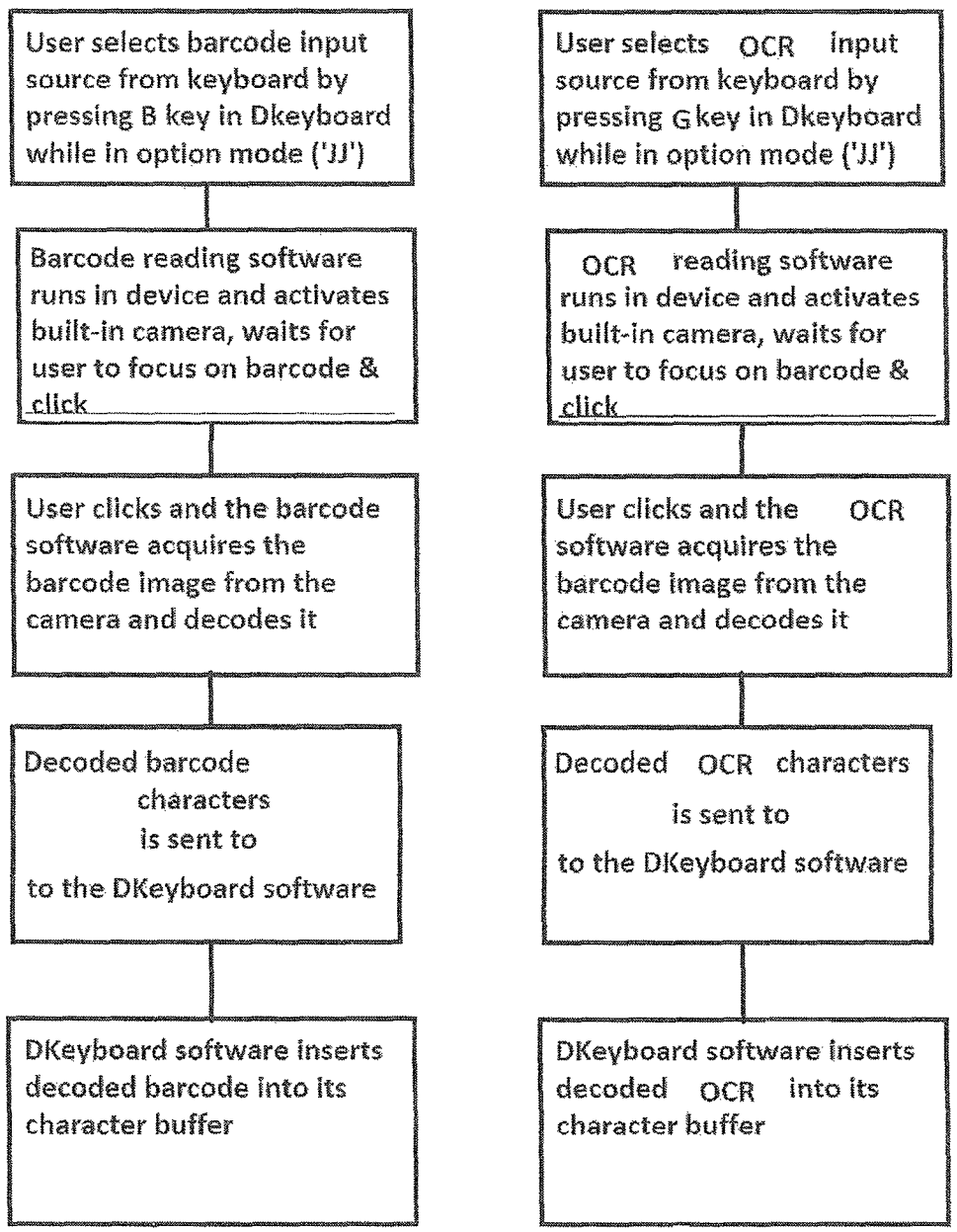
FIG. 11 illustrates a flowchart for Barcode input to keyboard buffer.
FIG. 12 illustrates a flowchart for OCR and Voice Recognition.

16] The keyboard 30, 100 can be scaled down automatically (reduce in size, typically both in height and width proportionally, so as to maintain the same aspect ratio) when its right hand boarder touches the devices (smartphone's, tablet's) rightmost, topmost, or bottommost screen's pixels edges (See FIG. 11).

17] The keyboard 100 can scale up automatically (increase in size, typically both in height and width proportionally—so as to maintain the same aspect ratio) when user 'pulls at left edge' by dragging it outward.

18] The keyboard 100 can scale/adjust individual keys 120 separately and differently, including: key diameter, key color, size, transparency, etc., key text size, font, color, transparency, italics, bold, key orientation, key outline, button text rotation, button text content/label, key text 'meaning'—text generated when key is pressed. It can also control/change other button(s) behavior when pressed (ex. toggle on/off, count up/down, etc.).

By way of one example only, a command mode change for a softkey (aka. Function key) can be entered to alternately append 'ON' then 'OFF' each time the key is pressed to the character buffer. Thus pressing the 'Laser' key in this mode will alternately send the command 'Laser ON', 'Laser OFF', 'Laser ON', sending one command each time the key is pressed but also alternating between the two suffixes each time the key is pressed.

19] The software can setup and/or add additional keys 120 with additional meanings (ex. characters or strings) and characteristics (ex. color, size, location, image, sound when a key is pressed, cause device vibration when specified key(s) are pressed, etc.). Keys 120 can have multiple commands/operations for each button, a sequence of commands/operations and not only a single command to be sent. Keys 120 can invoke commands which execute stored procedures or change the characteristics of themselves or other keys 120, or create or destroy other keys 120.

Figures 13, 14:
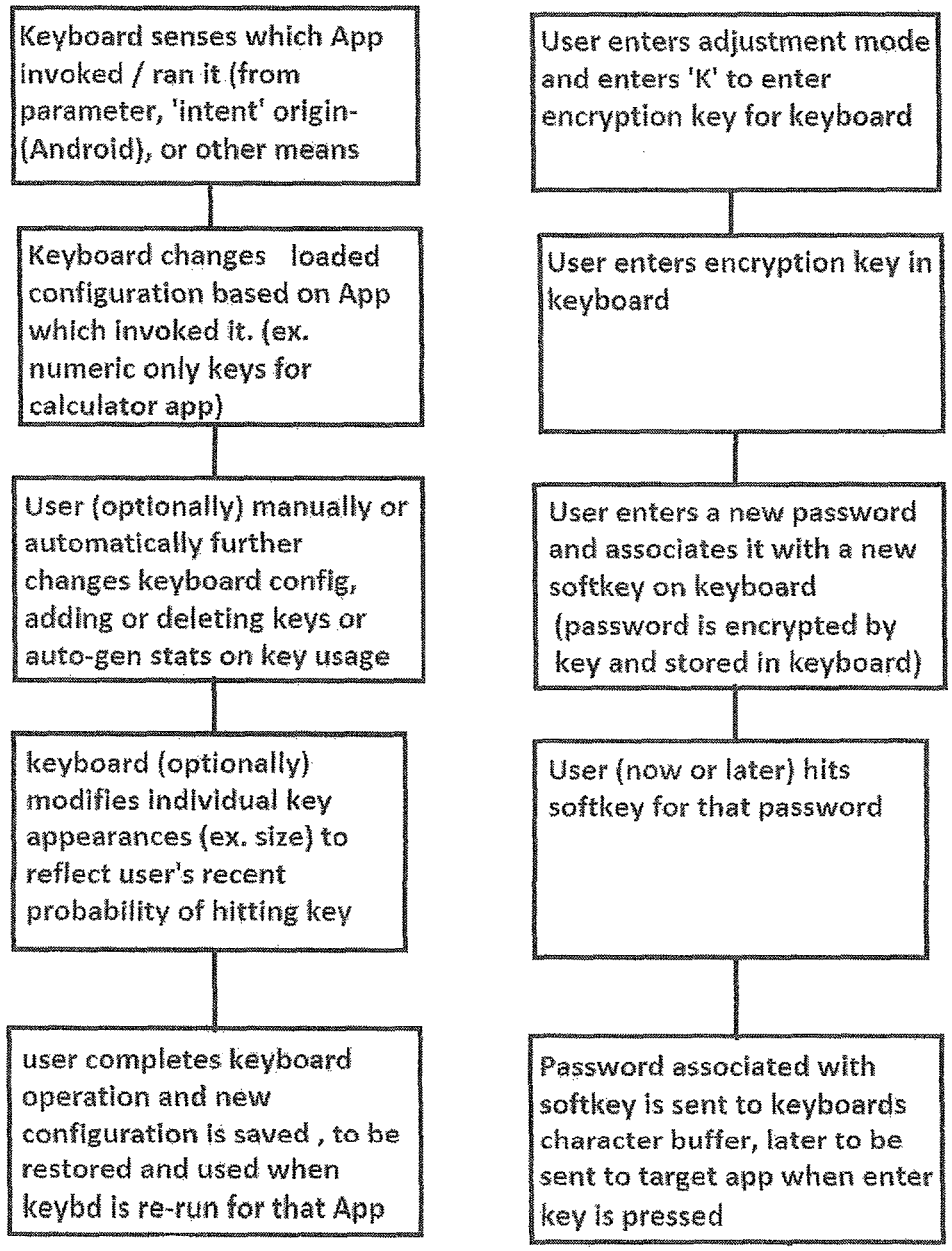
FIG. 13 illustrates a flowchart for automatically sensing application which invoked keyboard and loading associated/most recent configuration for it, optionally modifying the configuration, and resaving it when user is done.
FIG. 14 illustrates a flowchart for entering encryption key and passwords into keyboard's softkey for later recall and use.

20] The keyboard 100 can have AUTOMATIC, rather than manual configuration or app-sensitivity (See FIG. 13). Keys 120 can have different meanings/create different instructions depending on the context for example, an application sensed by the software executable code or program residing within the keyboard 100 or used by the keyboard 100 for calculations only. For example, a calculation/math/accounting type application using the keyboard 100 would invoke it with only numerical characters (0-9, '.') and math operators (+ − */ =), parenthesis, etc. or display much larger than normal numeric keys OR only display alpha keys if SHIFT key is pressed and/or have special keys 120 for SQRT(, SIN(, ^2, LOG(, etc.

21] The keyboard 100 can exit/disappear when the user hits enter, to reappear when needed, or remain on the screen, as selected optionally by the user.

22] The keyboard 100 can enter Adjust Mode quickly without using special keys—by sensing two or more consecutive unusual keystrokes entered such as 'JJ' 'QQ', 'YY', 'XX', 'OOO' which occur in only very few or no English words. They can still be entered if the following sequence (ex.) is used—'J\J' translates to 'JJ' without invoking the Adjust Mode.

23] The keyboard 100 can audibly annunciate or display the key 120 the user currently touching, and only 'generate' the keystroke character upon lifting of the finger. Further, the volume of the audibly annunciated or spoken synthesized character(s) indicates how 'on-center' or close to the edge the user's finger is. If the finger is 75% on 'G' and 25% on 'H', the respective volumes would adjust accordingly, proportionally or logarithmically so the 'G' sound would be discernibly louder than the 'H' sound. This is useful for the vision impaired individuals, small keyboards 100 operated with big fingers, or poor lighting conditions such as bright daylight.

Alternatively, a Bluetooth or hardwired earpiece and blank function-keys ('softkey') can be used to completely securely select options in a public environment, such as enter a PIN or to VOTE. The selection being designated solely by the spoken meaning heard by the user before he lifts his finger from the key. So a typical use of this would be for the user to place his finger down on the keyboard 100, listen for the key meaning of the key currently under his finger, slide his finger along the keyboard 100 until his desired selection is heard and then lift his finger to complete the key press operation and perform a key selection to be sent to the keyboard 100 buffer—visibly or invisibly, or with only non-descript 'placeholder' symbols seen. This can be combined with encryption to perform choice selection or messaging in public, completely visible to all, yet highly secure.

24] The keyboard 100 can use other color schemes/options for user preference, environmental lighting conditions or other means to indicate to the user with the application the keyboard 100 is currently 'connected to', addressing or feeding. It can have sliders to change the transparency of the keyboard 100 as desired, (see FIG. 9) in cases where the keyboard 100 is on a smartphone and the keyboard 100 is overtop the keyboard 100 buffer's destination Application, so that the application data can still be seen/read while choices are made in soft keys or data is typed. The keyboard 100 can have optional softkeys located on/attached/adjacent to it or located separately. If separately, they are preferably optimized to be easily accessible by the user's other/non-dominant hand, for example on the left hand edge of the keyboard 100 if the user is right-handed. The softkeys can be user definable or program definable, or be created by sensing what application invoked the keyboard 100 and loading a set of default or previously-defined-and-recorded keys when the application was last run and reconfigure itself to that way again. The softkeys can have commands which further modify the keyboard 100 characteristics (ex. expand specific numeric key(s) size(s)/individual key dimensions (if rectangular)/key diameter (if round) and reduce alphabetic-only key size(s)/diameter(s)). The softkeys can have commands which further modify the keyboard 100 characteristics (ex. change overall keyboard 100 size, location, add, modify and/or eliminate other sets of softkeys). The softkeys can be user-modified to be deletable, detachable/moveable/resizable or to attach specified/specialized graphics to them, for example graphics indicating a CAD operation such as display a 0.75 inch grid points, display dimension lines, etc. Examples of typically/generally useful softkeys may include user-first name, user-last name, user-address, user-email-address, user-phone-number, the 1st 12 digits of the user's credit card, etc.

25] The keyboard 100 may optionally require a password to create, load, change or display some/all/selected softkey contents or labels, so that ex. password(s) or account numbers stored in the keyboard 100 are not available and/or visible if the tablet or smartphone is briefly lent to another user.

26] The logical place to store/invoke and/or pass along, communicate, and convey passwords from, is the keyboard 100 already used in filling out forms. Further it is easier to secure the modestly complex software keyboard 100 code, rather than much more complex, whole large application code with many more lines of code and possible attack points.

27] Conventional Password-safe type software typically: "require copying the user name or password to the clipboard and then pasting the information into the required input field . . . " OR " . . . provides a function, Auto Type, that automates the entering of user name and password into a web form." this either requires additional time consuming, error prone steps or is risky from a security standpoint, entering key sensitive data without the user initiating the specific action to do so. Further there is typically only 1 paste buffer, so the selection of a different specific password from the last requires more steps than a simple keypress of a simply different password software button for a different account (See FIG. 14).

28 The keyboard 100 can dynamically reduce its size or change its configuration to accommodate added softkeys, a Voice recognition input selection button, current accumulated command line string from characters typed, specialized input acquisition pictures of barcode image area acquired focused in center of camera or of text image area to be OCR'd and inserted in accumulated command line string, to be sent to application upon hitting enter, or upon completion of barcode or OCR recognition.

29] The keyboards 30 and/or 100 can optionally receive and/or transmit its generated characters via UDP/IP, Bluetooth, IRDA or other means, ex. to a nearby tablet computer, permitting multiple users to type on the same tablet or allowing an easier effort to use keyboard 100 on a tablet computer or to fill in data on a smartphone.

Figures 18, 19:
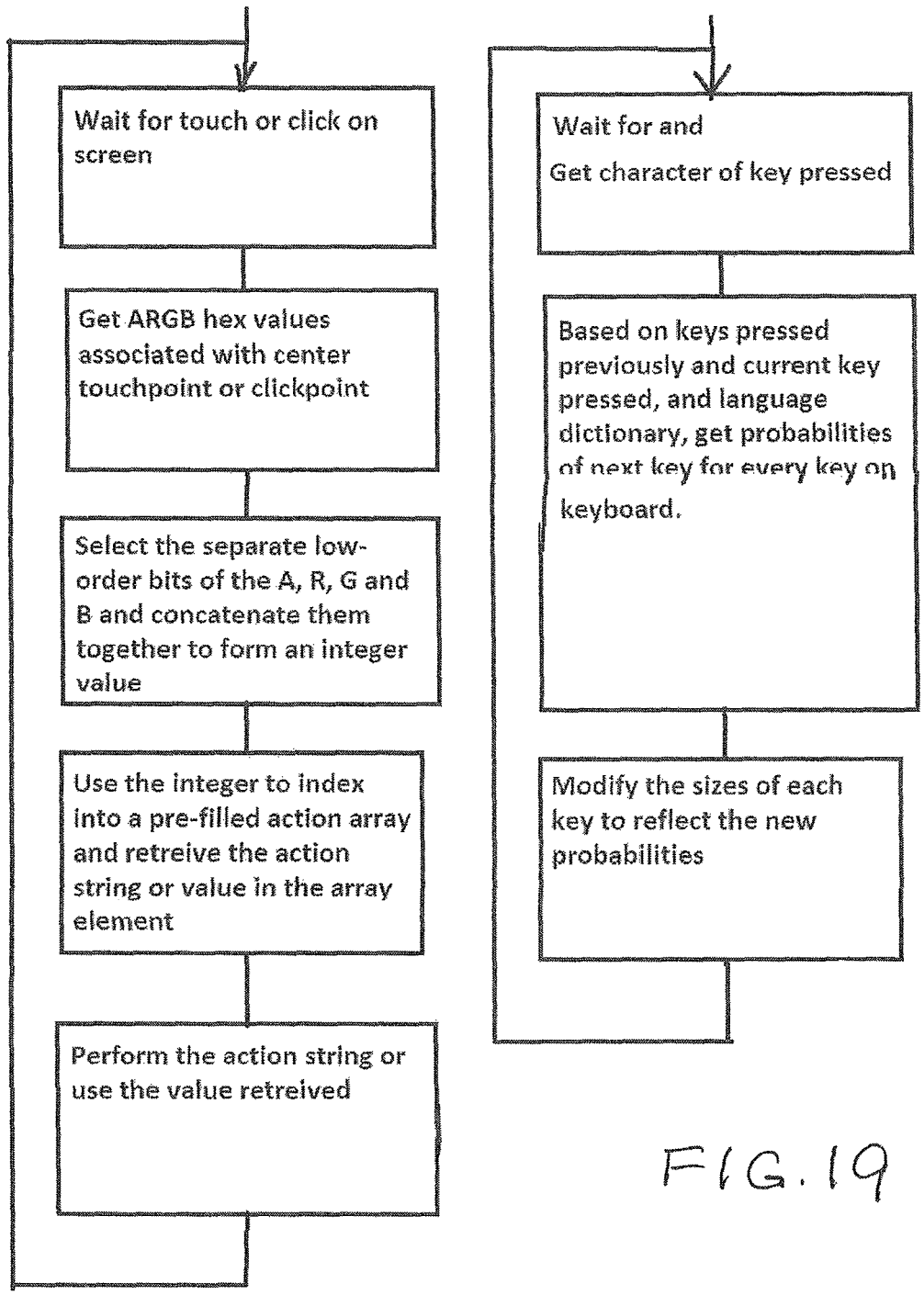
FIG. 18 illustrates a flowchart for decoding ARGB, preferably low-order bits, of point in region or button to generate an action or value for further processing.
FIG. 19 illustrates a flowchart for dynamically changing key size based on probability of next letter.

30] The keyboards 30 and/or 100 can dynamically Prioritize each key, so that the active touch sensitive region (which invokes its character or string transmission) of the key is actually invisibly larger or smaller than adjacent key(s), (and/or visibly a different color) (See FIG. 19) depending on a variety of indicators including:

31] The keyboards 30 and/or 100 are configured to dynamically change INDIVIDUAL key sizes separately based on the probability of the next character and based on the previous character or characters typed the current word. For example, if the letter 'Q' is typed as the 1st character of the word, the 2nd letter's probability of being a 'U' is quite high and the probability of it being a 'Y', 'I', or 'J' is far lower, and their active regions can dynamically adjust to be smaller based on the frequency % of the words in the language which start with 'QU' vs. those which start with 'QI', 'QY' or 'QJ'. A simple look-up table or 2-dimensional array of 26 possible index values, one for each character and 26 integer-relative-probability-values for the probability of the next character can be generated/created from the letter frequencies of the words of the language to dynamically create the area/diameter/probability region of the next character for each key 40, 120 to be typed as the word progresses. The 1st 26-value dimension represents the letter already typed before the current letter to be typed, the 2nd 26-index dimension represents the possible key to be typed next and the Array-sub-(previous-letter-index (1-26), possible-next-letter-index (1-26)) returns an integer or floating-point percentage probability value for each key on the keyboard 30, 100. In a similar fashion, the previous two characters can be in a 'probability value=array (26 (1st char), (2nd char), 26 possible next characters) array' for 26×26×26 elements based on the last/latest two characters typed and the frequencies of the 2-letter combination in the desired language. Also a dimension can be added for the character position within the word to further refine the probability, and/or more dimensions/character depth can be added for consideration of 3rd, 4th, etc. previously typed characters. It must be noted that the tables grow exponentially and can get quite large and become unfeasible with current technology beyond the 3rd or 4th character, especially on a handheld device with a limited memory but may be more suited in the future as technology improves. Array (char1,char2,char3,char-4,next-char5)=26^5 elements for 4 previous characters+next character=~12 million elements, compressible using 4-bits/element or ~+/−3.125% probability (6.25%=1/16 of 100%) resolution yields 6 Mega-bytes of table. 26^4=~450K elements or a 225 KiloByte table, a more reasonable number, while still considering the previous 3 characters typed.

32] The visible key characteristics AND/OR invisible edge between keys can also or alternatively be visually indicated by enlarging the diameter/dimensions of the keys dynamically and/or increasing the brightness/opacity/contrast or other visible means of the individual keyboard 100 keys separately.

33] Other active prioritization means can be generated based on previous user typing/selection under program states or conditions deemed same or similar conditions. For example if the user (or past anonymous software users) uses (automatically-sensed and internal-stats accumulated within the keyboard 100 program or user application) the 'rotate 90 degrees clockwise key' for use by a CAD program, and the 'rotate −90 degrees' and 'rotate 180 degrees' keys only 5% for each, the keyboard 100 could/would reflect the much higher probability of one over the other using a larger diameter key or sense area. The total key area may be truly proportional to the probability (radius squared generating area, sum of radius' squared of all possibilities=100% probability) or a less pronounced scheme may be used, such as the log 10 (key probability multiple) so that a key with 4× the probability will be log 10 (4) bigger or 100%+60% more area or 1.6× bigger area or ~1.27× the radius, not 1500% more area or 16× bigger area or 4× the radius. Methods in-between can be used or other coefficients can be chosen such as log 5 ( ) instead of log 10 ( ).

34] The keyboards 30, 100 can of course also use typical commercially available suggested next word lookup technology to augment or replace the above method. Alternatively, the word suggestions may dynamically application appear as softkeys in a separate soft-keyboard 30, 100 for the other hand at a different location on the screen, more easily accessible by the other hand's fingers.

Figures 9, 10:
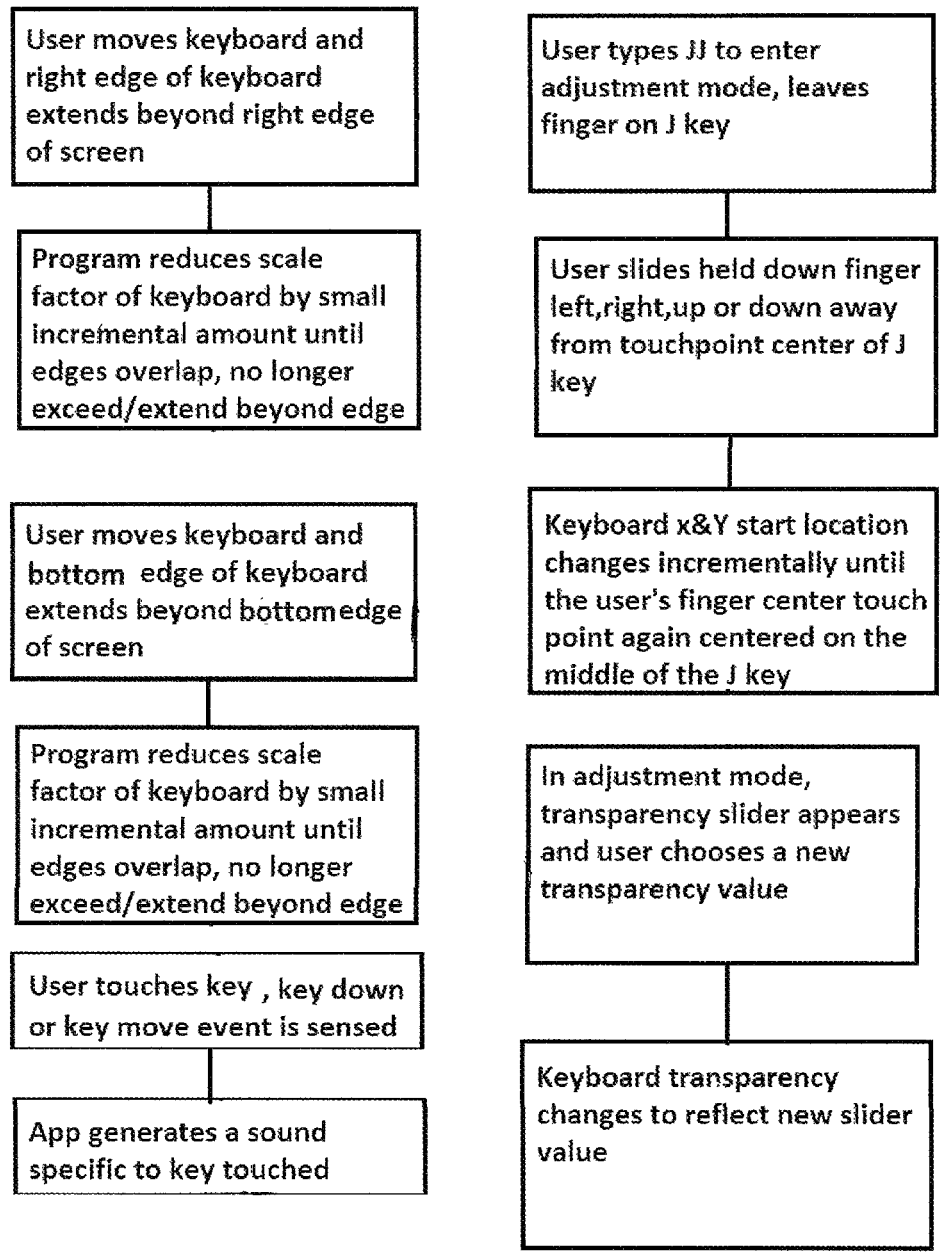
FIG. 9 illustrates a flowchart for moving and rescaling keyboard.
FIG. 10 illustrates a flowchart for entering adjustment mode and manually changing keyboard transparency.

35] The keyboard 30, 100 can be configured to allow the user to select and read a barcode entry into the keyboard character string or function key instead of or in addition to the user keypresses (See FIG. 9). This mode may be activated by user selection of a dedicated function key for that purpose, entering it as an option mode and selecting the Barcode-read option, or other means. The barcode request may activate the smartphone's camera which would wait until a barcode is seen or the user indicates a barcode is in the camera's read region and appropriate barcode recognition software would discern/decode the camera's barcode raster image and generate the alpha character sequence of the barcode, placing it in the keyboard's buffer and optionally hitting enter-key-virtually thereafter. This saves the user time and ensures accuracy when entering barcodes or barcodes instead of numbers manually. 2-D barcodes would/could be similarly read.

36] The keyboard 30, 100 can be configured to allow the user to select an area of visible alphanumeric text and perform OCR into the keyboard 100 character string instead of or in addition to the user keypresses. (See FIG. 12) This mode may be activated by user selection of a dedicated function key for that purpose, entering an OCR-specific option mode and selecting that option, or other means. The OCR request would activate the camera 13 which would typically wait until the user indicates the desired text is in the camera's read region and appropriate in-device text recognition software would discern/decode the camera's text raster image and generate the alpha character sequence of the text, placing it in the keyboard's buffer and optionally hitting enter-key-virtually thereafter. This saves the user time instead of entering numbers or text manually. It should be noted that Voice Recognition is functionally the same and/or substituted for Barcode software or OCR software.

Alternatively, the image can be captured and displayed in a region in/near the keyboard 30, 100 and the user can more easily type it (or walk away and type it) when the image and the keys are seen in the same region. Alternatively, if the OCR is unacceptable, as indicated by the user hitting a (ex. Dynamically generated 'no-accept key' instead of the enter key), the raster image may be transmitted over the internet to a service dedicated to reading more difficult text, perhaps using more powerful and/or specialized computer hardware/software and/or augmented with the client-server system or service employing humans to visually verify, or if necessary type the interpreted text in. Such a service may be paid for on a subscription basis or on a probability-pay type basis, where the software self-deactivates if payment is not rendered to the service provider within a specified period of time.

If a region to be OCR'd is captured by camera 13, the user may optionally black out undesired text in the still image as a pre-step before allowing the OCR to be performed. This can be done by the user touching and moving their fingertip over undesired areas, said areas being painted over or becoming darker, similar to paint program using a wide black brush.

37] Specialized real-time OCR algorithms can be used to translate one letter at a time, as the user slowly moves the smartphone's camera over the desired letters, and an artificial translation cursor-line centered in the camera image over the letters indicates selection of them for translation. This allows for immediate user selection of only the text desired, and real-time user judgment character-by-character as it happens, judgment as to if the current character text has been OCR'd correctly. It makes selection of only the desired characters faster, as no camera region needs to be pre- or post-specified. It also lessens the perceived delay in translation as it is happening while the user is moving the camera/device. Further, the cursor can be slanted by the user (by slanting the camera) to match the italics of the font visible in the screen to improve the recognition accuracy, using the user's eye for judging slant rather than pure software.

38] The keyboard 30, 100 can also be configured to select between internet-based voice recognition to generate the characters/words, instead of typing, or a local on-device voice recognition, esp. if the valid-result-choices are limited (few in number) or pre-known by the recognizer software. An alternative selection could be an option to speak and recognize the individual letters/numbers are spoken one at a time.

39] The keyboard 30, 100 can be optionally configured to use accelerometer input to slide keyboard 30, 100 to right or left if the device is first shaken and then tilted in either direction, or make smaller or larger if an upward (more G-force or less) is sensed. Alternatively, the keyboard configuration selection can be made faster by holding down a/the keyboard selection softkey and tilting/moving the device 10, thus causing alternative keyboard configurations to come forth. When the desired configuration is seen, the user lifts his/her finger from the keyboard selection softkey and the choice is thus indicated and made.

For example, a softkey may be (optionally) visible to select keyboard. The user presses that and rotates/tilts the smartphone/tablet backwards (along the axis thru the thinner width-region) of the tablet. This is sensed by the accelerometer and a larger keyboard 30, 100 is displayed next, one that has both uppercase and lowercase keys simultaneously visible and accessible. The user lifts his/her finger and that keyboard selection is made and is used henceforth. Now in reference to FIG. 14, the keyboard 30, 100 provides advantages in security aspects due to variable configuration, size, location and encryption:

by being embedded IN an APPLICATION, it CAN ELIMINATE the THREAT OF UNKNOWN KEYSTROKE LOGGERS.

If the keyboard 30, 100 were not in the default screen location, and/or not at the default size scale or the keyboard's individual keys are not in the standard location relative to the overall keyboard 30, 100, a touch-screen touch location event logger would not easily be able to determine what was typed.

When the keyboard's software encrypts the text (for example with a user-chosen encryption key) before sending the keystrokes to the application (for example email content, editor, etc.) the encrypted content is secured, in any local or remote storage, and on any transmission medium until decrypted on same device, the devices' application, or elsewhere at the receiving end of an internet file transfer, again using the encryption-key. There is no unsecured data existing even temporarily on the phone, except briefly inside the keyboard's application itself.

Since the individual keys 40, 120 can be dynamically reconfigured differently from a conventional keyboard so that as the user types the same password, different locations of screen touches are needed to invoke the same keys and a casual observer off to the side would find it more difficult to discern what keys or common words were typed by observing finger locations as the keyboard 30, 100 is touched. Further, the keyboard 30, 100 can be shifted in the x and y direction by sensing the accelerometer, redefining the key locations or values and offering more security should it be desired.

Two or more simultaneous finger input may also be used to further confuse an observer, where the actions of the other fingers is necessary or the added actions control the keyboard 30, 100 configuration. Alternatively, the added finger touches can be ignored by the software and it's unclear to an observer which touches were necessary and which weren't. For example, as the password is typed, multiple locations for various keys can be displayed or multiple colors for the same key scattered in various randomized locations within the keyboard 30, 100, and the user must wait for the correct color (color being unknown to the observer) of the key for the keystroke to be valid. Extra keystrokes on incorrect colors are ignored but would confuse an observer. The user can thus make the password as unobservable as desired, albeit requiring more time waiting for correct colors and waiting to type incorrect/ignored keys in to incorrect colors and correct keys in to correct colors. Also, this may be combined with other obfuscation means such as special key shapes or patterns which are required or ignored. Ex only orange triangle key, black letter font key, or blue oval keys are valid, all other (white-square, red-star, green-circle can be typed and are ignored.) The user must wait for correct color-shape keys to occur before pressing them, etc. Special keys indicating start of password or end of password can also be used to throw off an observer, so that the user has typed 20 extra keys which are discarded by the software, before actually starting the true password sequence, but an observer does not know which are important, and cannot repeat the sequence because he does not know where/when to start or stop next time. Only when the user hits enter, is the password processed and compared with the expected sequence.

The above form can also be combined with generated sounds to further confuse the interloper/observer, so that only keys typed when a specific sound is heard is valid. Sounds can include voice synthesized numbers or more abstract tones. (Longer and alternative passwords, with or without optional one-time-only recorded security prefixes and/or suffix strings, can be entered and/or deemed one-time only if there is ex. a crowd watching, as in a tablet used for access control. Shorter passwords can be used if it is known no-one is around or can be watching.) In accordance with another embodiment, There is also a software method to create a GUI (Graphical User Interface) based on the color of the region directly underneath the mouse click or finger-touch (centered X-Y coordinate) finger-down, finger move line, or finger-up event.

Current methods use the screen's x,y and length, width location of symbols in a look-up table to correspond the mouse/touch location to the symbol location which then causes a look-up of the action at that location. This conventional approach limits the complexity of the symbol's shape or symbol's boundary because a complex 2-d figure can be comprised of many intersecting arcs, ellipses and even not-yet defined mathematical shapes. This is difficult for the system to process and difficult for the programmer to define. So, typically a very complex picture has only a very simple rectangular boundary between its action being selected or not. Further, if one somehow constructed a complex shape mathematically, it is not evident to the user exactly where the symbol ends as typically simplifying assumptions are made.

Figure 15:
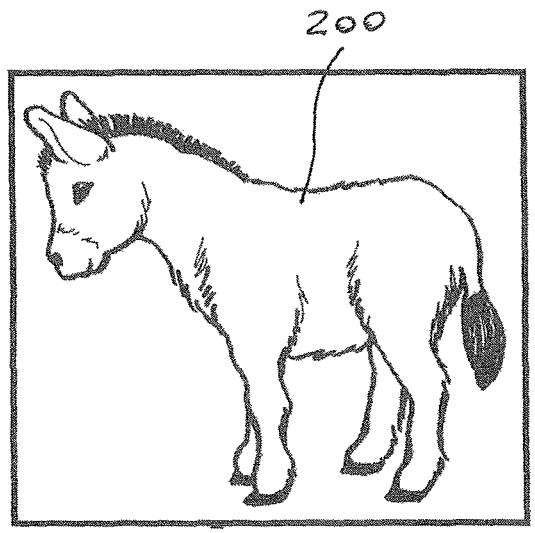
FIGS. 15-16 illustrate current state of art, two separate user selectable icons within their rectangular region of selection/selectability where clicked, the regions may have a boarder or the boarder may be invisible, the user can click or (center-of-) touch anywhere within the rectangles to select either a donkey of FIG. 15 or an elephant of FIG. 16 and presumably cause the software program to act accordingly and differently resulting from their two selection options.
Figure 16:
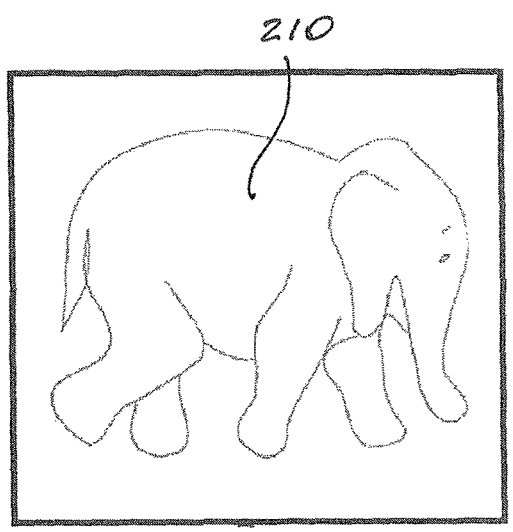

For example, suppose one had a screen with a choice between a donkey 200 or an elephant 210 of FIGS. 15 and 16. The current typical user-interface would have them completely separated spatially and a simple mutually exclusive rectangular region surrounding both of them would be used to determine which was chosen by the user. If the User clicked within one rectangular region, one choice would be made (See FIGS. 15, 16).

Figure 17:
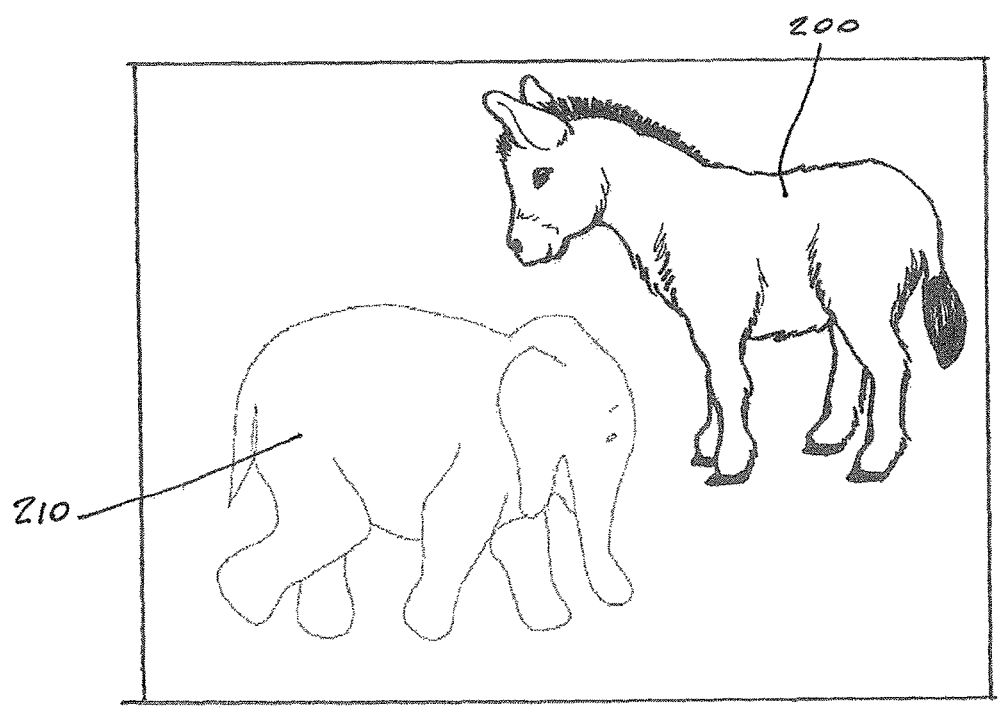
FIG. 17 illustrates a new appearance of separate user selectable icons, each very close to each other within the same general region and with a very complex selection border. Only clicks or touch-centered locations within their respective borders will cause the software program to act accordingly and differently resulting from their two selection options.

However, if the graphics were close together so that the images required complex boundaries to keep them separate, current systems do not easily accommodate this. Current systems would require a large or very large number of separate rectangular 'hit boxes' for each figure and additional processing time for the added 'hit boxes' and features they represent. This is seen in FIG. 17.

In the case of the above example, many may find the 2nd graphic (see FIG. 17) to be more pleasing, and it certainly requires less linear space, and perhaps less area than FIGS. 15, 16, but there is no current good way to identify if the user clicked within the elephant or the donkey, especially if the two animals are very close together, as is common, and the user clicks just inside the edge of a boarder of one of the animals.

Another example of the need and desirability for densely populated yet individually selectable graphics involves a set of simple and complex shapes, rectangles, ovals, etc., of various sizes, representing choices or finger-touch areas of varying likelihood, bias or weight are seen.

Using current GUI methods it is impossible to easily and also absolutely accurately select elements/regions A-J because their rectangular maximum outlines overlay each other.

Furthermore, the complex touchscreens, for example of the type used in Star Trek movies and series, show how the user would interface with them (select and touch the graphic's colored regions), but they do not disclose an easy method to discern which graphic was chosen by the user programmatically to correspond to a specific computer action-response. They also do not disclose accurate software driven means to easily but accurately ensure the correct graphic was chosen and correct action was taken. The graphic elements' shapes are quite irregular and complex.

Figure 22:
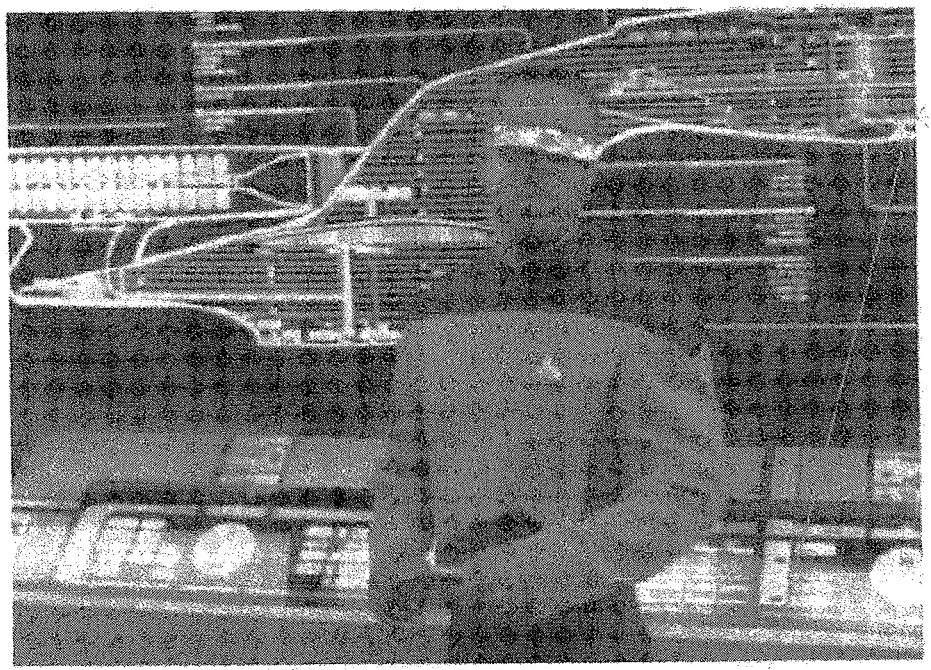
FIG. 22 illustrates a graphic with a very complex shape, unsuitable as an accurately clickable/touchable user-interface graphic using current single-rectangle based Graphical User interfaces (GUIs), but well suited to the methods of the invention.

By way of an example of FIG. 22, the complex graphic of the inner-vessel region, intertwined with lighter regions or the structural supports and hull. Presumably, touching one or the other will/should cause separate different actions or information to be accessed and/or actions to be taken. This is impossible to easily do with current software methods. Also note graphic 300 of the outer hull region touching graphic 310 in FIG. 6. The GUI Means described herein allows precision down to the pixel selected to discriminate between selecting one feature and feature's associated action from another feature and it's associated action, with no empty space needed in-between.

The claimed invention contemplates that crossing, overlapping, adjoining or adjacent elements should be separately selectable and capable of separate actions, as they have differently colored representations. By touching a region of two overlapping elements, seen as a different shaded color in the graphics, semi-transparently combining the colors of the two separate elements should potentially perform two separate functions, if desired. Touching a region of three or more overlapping elements also should similarly potentially perform three or more separate functions, if desired. This can be done by using the low-order bits for A, R, G, and B for separate functions for example.

Presumably, each region should contain different or more information and/or actions to be performed. The innermost region in the round-amorphous appears four layers deep and can/would/might have the actions/info associated with the three regions it is inside along with unique actions/info associated only with its graphic region. The software described herein can perform this function, as different regions can have visible or invisible bits set, said bits associating the region with none, one or may separate actions or pieces of information.

The user can select many elements in a graphic simultaneously. The resulting actions/info could be of all graphics being 'triggered' simultaneously. Alternatively, many graphics being triggered simultaneously may cause a more detailed and larger 'blown-up' graphical representation to then be presented to the user (in the same spot or separately) for further selection or discriminating action(s).

Yet another example of the need for easily generated yet action-discriminating complex GUI shapes is a dense keyboard 30, 100 for a smartphone, where the individual key sizes are dynamically adjustable based on the probability of the next character being that key which is based on the characters typed previously. The individual keys are preferably in an oval/ellipse shape corresponding to the fingerprint contact-area shape made when a finger is pressed against the flat touchscreen surface. These oval's areas dynamically change however. Further, better yet would the individual oval keys be in an overall Arc configuration and also slightly rotated within the arc to have all ellipses' major axes aligned to point to the arc center point.

If a user inadvertently touches outside of a key's oval (or other) shape in the region between keys, it is presently preferred that there should be no action taken. This is not possible with the current crude representation of the oval by a simple rectangle shape. Presumably the user would select the preferred hand, or in a large tablet's touchscreen, both right and left hand screens would be shown and be available, preferably the left hand keyboard 30, 100 on the left hand side of the screen, the right hand keyboard 100 on the right hand side of the screen.

The method to encode the regions and generate correct actions-selections only if the mouse click or touch center is within the complex shape's region is as follows:

Using an Alpha (8-bit), Red (8-bit), Green (8-bit), Blue (8-bit), (32-bit total) ARGB Color method as is typical in smartphone graphics, Color the separate regions slightly to very differently. (A 16-bit per A,R,G,B would be possible/feasible/better, especially if the lower 8-bits were used for region identification only.)

Use the ARGB lowest order 2 or 3 bits to UNIQUELY identify and match each region. Depending on the number of low order bits used and the user's eye sensitivity, these slight color variations may not be visible (See FIG. 18).

Combine the Bits to Create an Integer Value,

Use the value to index into an array which dispatches an action to be performed based on the index value.

For example, in the case of the Donkey and the elephant, the Donkey's inner region's coloring bits may be:

A=11111111=255 or hex FF (alpha=255)
R=11111110=254 or hex F<u>E</u> (red, almost pure red)
G=11111111=255 or hex FF (pure Green)
B=11111111=255 or hex FF (pure Blue)

For a combined effect of almost pure white with a barely discernible blue-green hue due to slightly less red than perfect white.

. . . Whereas the Elephant's inner region coloring could be:

A=11111111=255 or hex FF (alpha=255)
R=11111111=255 or hex FF (pure red)
G=11111110=254 or hex F<u>E</u> (almost pure Green)
B=11111111=255 or hex FF (pure Blue)

For a combined effect of almost pure white with a barely discernible purple hue due to slightly less green than perfect white.

If this used only the last bit of each ARGB color for a total of 4-bits, the 2^4=16 possible regions could be defined. Only the last bit in this case is extracted and combined into a 4-bit index into a 16-element array. The elements of the array 'point' to actions, subroutines, methods, or action-codes to be taken when the color under the finger-touch point or mouse click point is either ARGB=hex FFFEFFFF or FFFFF EFF. The index byte is constructed/computed by:

```
int iIndex=(A and 0x01*8+R and 0x01*4+G and
    0x01*2+B and 0x01);//where 0x01 is a bitmask
    to select//only the last bits
```

In the case above, touching inside the donkey would create the index code 1011, Hex 'B', or decimal value 11, touching inside the elephant would create the index code 1101, Hex 'D', or decimal value 13.

The action array could generate an opCode string or string of method to be invoked by:
String[ ] sAction=new String[17];
sAction[11]="mDonkeyMethod";
sAction[13]="mElephantMethod";
String sActionChosen=sAction[iIndex]; And typical appropriate means to execute sActionChosen using 'Reflection' means in Java language (for example) could be used.

Painting/Generating the templates by or for the user could be done with a modified paint program or even a standard paint program. Alternatively, a complex set of mathematical operations may be used to draw the keyboard 30, 100 or graphical elements on the screen, but the same very simple software means may be used to determine which region was clicked/touched. For example, a GUI made of numerous complex rotated, resized ellipses and other shapes overlapping or overwriting the others in regions would be difficult to decode mathematically, based on the x, y location touched. But based simply on the bits mapped or colors mapped under the touch point makes the code fast, with no additional overhead for complexity when 'reading' where it was touched.

This is especially true on simpler platforms without dedicated gaming hardware processing capability and where cpu power and memory space is limited, such as smartphones. Using this method, the application can achieve greater accuracy, graphics complexity, graphics flexibility of design, and runtime processing speed on an ARGB-based graphics system in Java, such as an Android platform, with little additional program complexity, programmer time, or programmer effort.

Another example of the desirability of this method in verifying/processing a click is inside or outside a region previously drawn on a screen is in a complex gaming application. The figures drawn, including body shapes, arms, legs and fingers and holding objects of varying shapes and sizes present a very complex shape. Further, the figures are often in front of (overtop of) other figures and dynamically drawn, continuously moving and changing in shape, size and location on screen. In this situation, far greater realism and accuracy can be achieved by using this method rather than a simple rectangular 'hit box' or set of many 'hit boxes'.

A standard paint program can be used if the user desires visibly different colors and the higher-order bits are selected by the bit-mask, such as bitmask 0x80 or binary 1000 0000 or decimal 128. In this way Solid red fill of a shape would invoke a different action than a solid/pure blue, solid/pure white, solid/pure black, solid/pure purple(red+BLUE), solid/pure blue-green or solid yellow, etc.

Further, more sophisticated means (yet still simple) can be made to prevent color variations from being seen by several methods: Briefly flashing the/a different color mask screen only when the user touches the screen, Filtering out the low order color bits before displaying the bitmap, so all variations are invisible, (by forcing all the low order color bits to 0 or 1 regardless of what they are set to in the original discriminating bitmap containing the shapes and their inner regions). By creating an entirely separate and 'colorless' 2-D array which contains the index values in its elements, said 2-D array being the same size or a proportional size to the screen pixel resolution, By hashing the mouse or touch X,Y location into an table and looking up the action string based on the element selected in the table.

Further, a program can generate the graphics, calculating the colors of each region (for an elliptical-keyed keyboard 30, 100 for example) by adding the letter number of the key (a=1, b=2, etc.) to the base key color of ARGB=0xffFFff80 for a yellowish-white keyboard 30, 100 (pure red+pure green+50-100% blue), whose letters would only slightly vary in color based on the letter number value, the 'Z' character key being closer to white than the 'A' character key.

More precisely, the % blue=(255−TheNumberOfKeysInKeyboard)/255*100. For a 100 key keyboard, it would be ~60.5% blue at the worst.

Spreading out the 'color-variable-bits' among all 4 ARGB bytes would yield a less discernible variation in colors, as would using more color bits. Spreading them out, one would need only 7 bits total across all 4 bytes or the 2 lowest order bits per color of A,R,G and B.

It should be noted that the appearance of the graphics and keys 40, 120 on the screen is not necessary for the functionality of the device or for the user to effectively use the keys 40, 120/keyboard/graphics selection. The backlight may be off or burned out and the color bits remain associated with the needed regions of the screen (although invisible) and the touchscreen or mouse will still work. A blind person may simply know the region's location relative to a corner or edge of the screen, and feel the edges to press the desired region to perform the desired action accordingly. This is especially true of a few relatively large 'graphics' separated by large regions on the screen. Alternatively, it is true of 2 or 3 large regions within regions in the same screen where the innermost area performs a different function from the region adjacent to the edge of the screen.

A sighted person briefly waking up at night may wish to perform a selection on the screen (such as issuing a command to speak the time) and may not want to open their eyes and look at a bright screen to determine where to touch it to invoke the command. He may conceivably do so by using feel and touch alone, knowing the size of the device and the relative locations of the regions on the screen. A separate innermost region selection by the user may give lengthier and/or detailed information regarding not only the time, but also temperature, weather forecast, brief news items, and/or turn on his favorite radio station. Again, these separate and very distinct actions can be invoked by the user without light being emitted from the screen, possibly disturbing another sleeper in the room, and by touch alone requiring no vision.

Tactile feedback can also be used to invisibly navigate on a touchscreen which is not illuminated. A vibration motor typically built-in to smartphones can signal the region you are touching by pulsing in a specific pattern or at a specific frequency and/or both. In the case of the sleeper above, the device would pulse vibration faster or with a longer duty cycle as the user passed through distinct region bands from the outer edge of the screen to the innermost center of the screen. In this way the device would emit no light or sound, yet the user can make a selection without opening their eyes. In this way the user can select 'do not disturb', disallowing any phone calls from ringing. Further a driver of a vehicle can touch a region of a touchscreen in or through his pocket, with or without the screen being visible or lit, and select an action to be performed without averting his eyes from the road. Useful actions might include answer a phone call, record a note, request the miles remaining to the destination, or send a voice message.

The keyboard 30, 100 may continuously emit a sound depending on the key or key's 'region' currently touched, indicating the operation to be performed if the user lifts their finger from that point. The user may then move to a different region to opt to perform a different action instead, the original action not being performed because the finger lift never occurred from the original region. A region of no-sound and no-action is envisioned as useful to opt to do nothing if that is the user's final decision (See FIG. 11).

Also, feedback as to the function of the visible or invisible graphic underneath the mouse, cursor or fingertip-center may be given by a set of indicating tones or by a speech synthesis or speech recording being played, indicating the function to be performed, should the user wish to perform that action, upon raising their finger from that particular spot. Should the user not desire that function or wish to select another function, the user need only move their finger to another location without lifting it. It is envisioned there can be a null region in one or more pre-known areas of the screen that the user can move to before lifting their finger, if NO action is decided upon. Alternatively, multiple finger down sensed can indicate abort the action, change to a different 'screen' or set of functions, perform the action, give more information about the action or its default settings, of set/change the selected action's default settings, etc.

Separate multiple actions can also be associated with very visibly different objects of separate colors and their separate associated high order bits instead of low order bitmasks and using separate action tables, as opposed to using lower-order bits in similar or visibly apparently same colored objects.

Separate multiple actions can also be associated with time change encoding of the colors sensed or time change encoding of the lower-order bits. For example, if the lower order bits alternated between '010' and '011' then this can be used to indicate a different action to be performed than the code inside a color alternating between '110' and '111'. This example has a sequence of two total patterns, however it is envisioned a longer length sequence of patterns can be used or a variable length coding scheme can be used. In this method, it must be noted that there must be means to enable or force sufficient dwell time on the desired point to obtain or queue up all the codes in the expected maximum sequence length. For example, if a sequence length of 5 is expected for a code such as '100' '010' '100' '011' '011', then sufficient dwell time must be allowed for the point touched or clicked at to obtain the 5 codes. Clearly, the total time needed may be mitigated/reduced by increasing the speed with which the alternating codes are sent to the screen. This can also use older techniques of bit serialization such as those used in serial communications such as rs-232, etc. where bits are combined to form start bits, stop bits, characters and words, etc.

As noted elsewhere, the low order bits used for the action selection may be masked out or not sent to the video/display output so that they have absolutely no visual effect on the overall colors seen. The drawback of this is it reduces the total numbers of colors available to be used by the programmer and/or user. For example, if only 6 bits instead of 8 are available for the R, G, and B color components, then instead of having $2^8*2^8*2^8$ colors=~16,777,000 colors, one would have $2^6*2^6*2^6$ colors=~262,000 colors. A 262,000 color arrangement would be by far esthetically large enough in a purely graphical display of a keyboard 30, 100, symbols, technical schematics, etc. but may be esthetically objectionable in games containing more realistic real-world pictures of scenery, sky, plants, animals or faces.

Figure 20A:
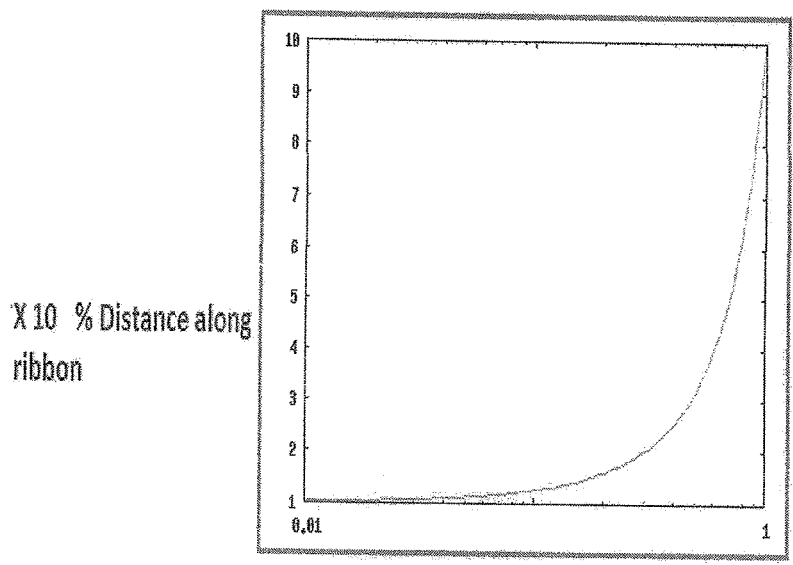
FIGS. 20*a-b* illustrate a Taper Gradient used to select a non-linear value, visually evident from the coloration of the pixels.
Figure 20B:

A colorized ribbon, can be visibly or invisibly encoded depending on the number of low order bits in the color gradient used ex. 4 bits from R, G, and B each=$2^{(3*4)}$=$2^{12}$=12096 steps of resolution, to represent the curve of any math function and the coloration value at each point is evident/obvious/visible relative to other coloration parts of the ribbon and the color picked by touch is used to create the value output to ex. a volume control. This can be generated to encode and decode to be a 'log taper' as is common in audio hardware potentiometer knob control applications. See FIGS. 20a-b. (Note the example shown uses only the 'G' and 'B' component of the RGB.)

Figure 21A:
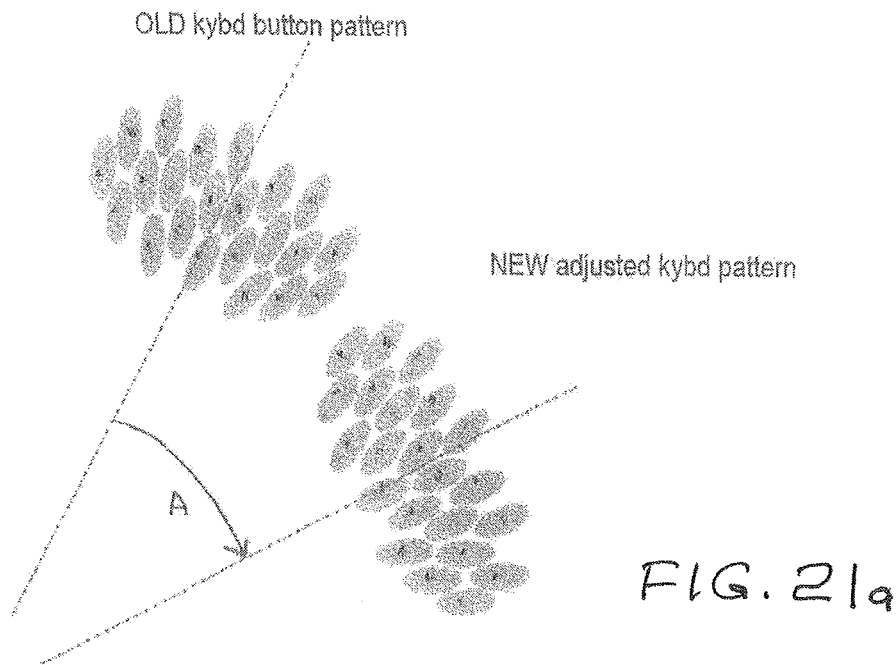
FIGS. 21*a-b* illustrate automatic keyboard adjustment shift which can be made when the finger touch average major axes angles footprints are not consistently approximately the same angle as the oval keys' average of major axes angles and further illustrating that when the average major axes angles are not approximately equal—it indicates the user hand is positioned in-optimally and off to the side and the adjustment disclosed improves the ergonomics, also allowing a more complete coverage match between the finger press ellipse and the keyboard key-button ellipse, within or overtop each other.
Figure 21B:
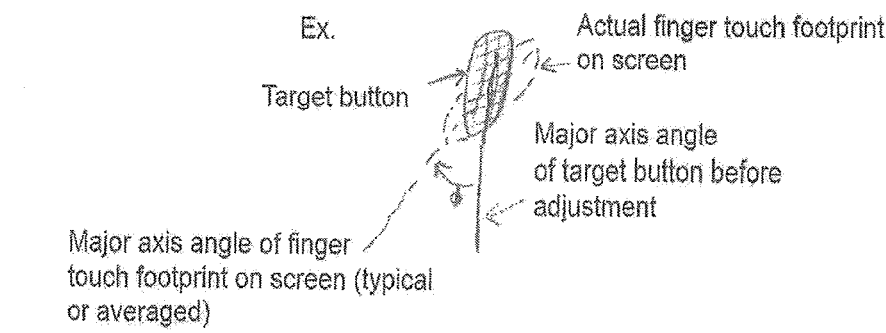

The finger Rotation angle on the touchscreen can also be used simultaneously in real-time to automatically adjust the GUI for the user . . . . An example would be to adjust the overall keyboard angle so its average center angle aligns with the average angle of the fingers typing on it, and/or also adjust the average angle of the fingers hitting the individual keys, automatically adjusting to the user as he types (See FIG. 21a-21b). The individual key angles can be adjusted by calculating the average angle of the touch pattern ellipse major axis on the screen for the last 10 touches and adjusting the button pattern ellipse accordingly to match the new calculated major axis angle. See below.

The overall keyboard angle can be similarly adjusted by calculating the average angle of the touch pattern ellipse major axis on the screen for the last 10 touches and adjusting the overall keyboard angle by the following formula New keyboard center angle=OLD keyboard center angle+(actual average angle of the sum of touch pattern ellipses' major axis–key's average angle of the touch pattern ellipses' major axis). Experimentation may show that coefficients or sign changes may be preferentially useful depending on the frame of reference being above the screen or beneath it. This would compensate for different user arm lengths or freedom of elbow movement in confined spaces such as an airline seat with adjacent passengers.

A 'speckled averaged color mix' can be used to hide the slight color variation between many keys 40, 120 or touch regions. So many separate mixed regions of pixels (ex. seen and functioning in the form of many separate keys 40, 120) can be made to average out visually to be the same color, if desired, although their high order bits may be very different values, and when clicked on return different values causing different actions, and yet appear to be an identical color. For an extreme example, a region with 100% grey pixels of value 0xFF777777 with the last 3 low order bits=(111 base 2)=7 result in a very similar appearance as a region with ~50% (49.58333%=77hex/F0hex=119/240) whitish pixels of color value 0xFFF0f0f0 and ~50% (50.41666%=100%–49.58333%=(240–119)/240) black pixels of color values of value 0xFF000000 (with the last 3 low order bits=(000 base 2)=0), yet the bit values are very different. The color format is a typical (ex. Android smartphone or tablet platform) AARRGGBB hex values. Many other color value combinations of two or more distinct values can yield the same visual appearance yet have different low-order bits creating different desired action results.

Using this new method, Gaming applications in Java are easier to write and also more accurate as the targets' boundaries edges' are better defined than the simple 'hit boxes' commonly used in current methods. In a complex object, numerous hit boxes would be needed using current methods where our method is no more complex or CPU intensive with simple or extremely complex 2-d shapes.

Using this new method, actions can be inconspicuously and easily embedded in pictures; said actions can further be in the form of URLs or sounds associated with visibly colored regions (using high order bits), or invisibly colored regions using the low-order bits. The form of the picture can make it obvious (using black boundaries and/or text) or be invisible as to which locations and where the user action of clicking in the picture result in program actions and what specific program actions are taken/processed.

Actions can define regions suitable for text placement, text format (similar to html css), or text fields/data fields types (ex. Numeric, alphabetic or picture), picture regions, etc. as a method instead of HTML. The regions can be filled in a fashion similar to how an internet web page browser fills in a screen from text and picture data files, said fill-in actions depending on the coloration location and value of the 2-d regions in the visibly or invisibly colored screen 'template'. Thus, design of forms without a text-based HTML, but with drawn different colored regions on a form template for describing complex shaped regions of text, pictures, values from database to be read/saved, keys 30, 120, checkboxes, sliders, pull down menus, etc. can be done. Multiple bitmap layers for many properties can be created/used, achieving great depth and flexibility, with simplicity of code, user design effort, and little user interface knowledge. The drawback is the considerable additional memory needed for the additional bitmaps; however, some compression can mitigate this need in storing or transmitting the templates. Added attributes settable by one of many possible layers in a multi-layer control form may be font size, font color, background color, protected field vs. unprotected, numeric vs. alpha vs. alphanumeric, text transparency, JS handlers indexed to run upon click-event, etc.

Examples of applications' user-interfaces which would be much simpler using this method than current methods include: —A restaurant menu with a chicken or cow graphic, eliminating the language barrier, the customer simply points/touches/clicks on the part of the chicken or cow he wishes to order. If a chicken leg is indicated by touch, chicken drumsticks are ordered, if chicken breast is touched, chicken breast is ordered, etc. A beef, lamb, or pork-based menu would be more complex, containing more separate regions, as many more commonly recognized cuts of meat are known. —A specialized curved music keyboard 30, 100, such as an arced piano keyboard 30, 100 on a touchscreen, where each key (no matter where touched) has one discrete tone value, and all keys have the same or varied color appearance, visibly or invisibly coded differently, yet no matter where the key is touched the output tone is the same. Alternatively, regions within each key, such as towards the end, can have different characteristics such as more tremolo. —Alternatively, continuously changing music keyboards with linear or non-linear regions of frequency change can be easily constructed. This could easily be used to simulate the Bassoon musical instrument. —Changing of real-time process control settings where the color changes non-linearly and directly represents the output value chosen (directly under the mouse click cursor, rather than relying on the mouse X-Y position and calculating or generating looked-up values from that) (Ex. butterfly valve position in a PID control-loop, especially a cascaded control loop where the past and/or averaged results in the process output (ex. units produced at that specific pressure or temperature) of the valve position are represented by the x-axis length along the ribbon, and the coloration indicates the valve position to move to. Here some visible coloration may be desirable indicating the nonlinear mathematical % value of valve open by color vs. process output % by distance, and the higher-order color bits may be used. Alternatively, a 2-D X-Y graph of color gradients (ex. lighter red to darker red on the x-axis, lighter blue to darker blue on the Y-axis) can allow the Red and Blue values to be pulled out at the point chosen and that value pair is then used to set two separate process variables (ex. furnace temperature setpoint and combustion air scfm setpoint). Again, the gradients would not necessarily be linear, may be generated from historical results of past process settings, would be simple to code and the characteristics of the gradient would and/or could be visually apparent. Many process diagrams have complex non-linear characteristics which are not or cannot be reliably/accurately/feasibly modeled in math. A complex gradient chart would be an iron or iron oxides phase chart of temperature vs. carbon content in the reducing atmosphere of a blast furnace.

Thus, the arced, non-rectangular arrangement and/or transparent representation of keys 40, 120 has the following advantages over the conventional keyboards. In a first aspect, it accommodates a pivoting motion of the wrist and/or elbow, allowing a simpler two axis motion of a) pivot . . . and b) reach finger outward to more perfectly match a oval/rounded fingertip with a similarly shaped key . . . (when typing on a rectangular keyboard, the rectangular buttons are arrived at from different angles, some from sideways (typing the letter y for example) while others are arrived at from the bottom (for example the letter p). In the instant invention, each key 40, 120 is covered by a finger in the same basic orientation. It is believed that the above also reduces error rates in a physical embodiment of this keyboard, while conventional rectangular keyboards require more complex thinking to covert the angular hand or elbow motions to a rectangular keyboard mapping.

In a second aspect, it allows more screen space to be effectively used for the keyboard (as opposed to a typical rectangular keyboard on the bottom of the screen using less than 40%—with smaller resulting keys), making each individual key also larger as a consequence, without distorting the keyboard.

In a third aspect, it allows for one hand to comfortably hold the device (for example with a left hand) while the other hand is dedicated to typing. This is important in iPad/tablets which are larger and heavier. The left hand is dedicated to holding it solidly, not allowing it to drop, while the right hand is dedicated to typing. There is no constant shifting of which hand is holding while the other hand is reaching for a key, making typing more mentally complex or careful. 3.2) also, in children, their weaker and smaller hands can hold it more strongly and steadily if one hand is dedicated to holding and one is dedicated to typing. Thus, outdoors in windy environments or in a moving vehicle, there is less chance of dropping the device 10 or entering wrong data.

In a forth aspect, the natural QWERTY keyboard has a wedge/funnel/angle effect naturally going from 10 keys (0-9) to 10 keys (Q,w,e . . . - . . . p) to 9 keys (asd . . . L) to 7 keys (zxcvbnm) conforming well to the keyboards semi-triangular shape with the 'bottom' at the lower right corner (for a right handed person).

In a fifth aspect, each key is rotated at a different angle to orient its bottom towards the common center of arc . . . this one is more than just diagonally arced, the angle of rotation of each key in the arc, along with the location of the key in the arc, is specified so that the angles of all keys cause the bottom of the keys to point downward to the arc's single rotation point (approximately somewhere offscreen where or between the users wrist or elbow rotation point would roughly be, on average.

In a sixth aspect, the aspect ratio of the keyboard (degree of arc) matches well the typical width×height of a smartphone or tablet, comfortably using maximum space for largest keys possible. This would not work as well with a ninety (90) degree wedge keyboard, as the pivot point would be on the tablet far shorter than the users hand or arm length . . . so the angle of arc is less when accommodating the human body.

In a seventh aspect, if the keyboard 30, 100 is semi transparent and an application program with text and/or graphics is visible beneath it, as the keys 40, 120 are large and diagonally disposed, they typically do not match the features of the application underneath them and are easy to visually differentiate from the application features and text underneath than a semi-transparent rectangular keyboard overlaying an application underneath it of the same orientation.

In a eighth aspect, the keyboard's key locations are preferably arc shaped to accommodate the user's finger/WRIST/arm length, where the pivot point is around or between the WRIST or elbow for optimal ergonomics, so that the row of keys is selected solely by the finger outreach, and the chosen key within the row is solely selected by the wrist and/or elbow angle of arc. This is different from a rectangular keyboard where a coordinated action of both finger outreach and wrist angle change is needed for every character separately. Also, when the key location is finally touched in the diagonal keyboard, the fingertip's oval shape can always be oriented with the key's oval shape, allowing maximum area of touch certainty for that key. This is in contrast with a rectangular keyboard where if the finger comes down between rectangular keys at an odd angle, it is less certain which key was intended.

In a ninth aspect, because text, numeric data and wording is left justified, the right area of the screen is filled less often than the left area. This is especially true of a column oriented list of data such as a list of names, numbers, name and phone number, etc. The diagonal keyboard, usually and optimally is attached to the right for a right hand individual typically edge and uses this space effectively, and does not use the left edge area as much as a rectangular keyboard.

In a tenth aspect, a flick motion of the finger along the arc of the keyboard within the keyboard is seen as an easier, better, more understandable, and more esthetically pleasant way to select a different set of keys (from alphabetic to special symbols to specialty math symbols for example), visibly rotating a new keyboard into place, the axis of rotation being around the invisible off-screen arc center. Flicking in one direction or another direction allow for selection between one or the other keyboard(s). A virtual circle of many keyboards, only 1 visible at a time, can be conceptually understood. The visible rotation should match the finger speed and incorporate a friction or drag component to better match the understood characteristics of a rotating wheel of mass on a pivot bearing, with an indent stop to enable the keyboard to stop at a whole keyboard and not in the middle between two keyboards.

For example, a typical flick motion would place the fingertip down in or just outside one key ('F' for example) and drag the finger across the surface maintaining contact with the surface over and across the 'G' and 'H' keys into a portion of the 'J' key where it lifts off the keyboard surface. This motion does not have to be exact, and a reasonable minimum would be to touch down in a separate key's region than where you lift up, maintaining contact all the way. A specific minimum angle of arc can be chosen to reflect this, and they need not be in the same row.

The set of keys may be optionally changed by a simple flick motion anywhere on the lettering and the finger contact line of the flick substantially at a tangent with the arc center, this will cause the appearance of the keys smoothly rotating about the arc center, causing new keys (special character keys for example) to appear from the edge nearest the starting point of the flick and existing keys smoothly disappearing into the edge nearest the ending point of the flick.

Also, typically on a conventional rectangular keyboard with the phone oriented in portrait mode as is typical, only the thumbs are used/useable for typing, whereas a diagonal arced keyboard allows for multiple fingers to be used, allowing for faster typing. Also, typing on the conventional rectangular keyboard located at the bottom of the screen with the thumb often means that the keys are hit not by the center of the thumb but by the side, creating more error. Typically, the diagonal arced keyboard keys are touched close to or on the center of the finger, this is more intuitive as the user knows where the center of the finger is and is less error prone.

In another embodiment, the diagonal keyboard can be comfortably scaled up to use over 70% of the screen area, without any distortion of shapes, allowing for a large faster typing keyboard of the same configuration as a reduced size one. This cannot be said of a conventional rectangular keyboard in portrait mode or landscape mode. Neither of these can be scaled up without distorting the key shapes taller.

In further embodiments, the center of the arc is at or near a location inside the user's arm, the longitudinal axis of each key intersects with the arc's center and each key lettering is rotated to be parallel with the arc's center. Those with longer or shorter arms may change the arc center point or arc radius by decreasing the arc curvature, especially when their freedom of arm movement has changed.

It is also possible to have a virtual numeric Psuedo-RGB array of identical size and shape to the keyboard picture, with each element number of that array corresponding to a screen ARGB pixel, and using that in place of the ARGB color of the pixel to create the value used to indicate which key is pressed. Any changes to the keyboard picture (load, resize, move, etc.) would also be done in parallel to the virtual Psuedo-RGB array so it would always be up to date and reflect the key region's values. Using this, the keys can all be the exact same color, but only the unseen virtual Psuedo-RGB array's values would be used to determine which key was pressed.

It is also to be understood that various features can be intercgangeably employed between keyboards 30 and 100.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

What is claimed is:

1. A device comprising a processor executing a machine executable software code, a memory, a rectangular display screen with orthogonally disposed edges defining a quadrilateral shaped surface of said display screen and a diagonal virtual keyboard displayable on said display screen surface during use of said device, said diagonal virtual keyboard comprising:

arc shaped rows of virtual keys defining a keyboard axis, a keyboard diagonal sized and oriented to span and utilize area between opposite corners of said display screen surface and side borders of said diagonal virtual keyboard so that all alphabetical keys are displayed on said display screen surface;

said keyboard axis running through a point formed, external to one side border of said device, by an intersection of first and second secondary axes, wherein one of said first and second secondary axes is disposed inwardly from and parallel to a respective side edge of said display screen surface, wherein an angle of an arc, defined by said first and second secondary axes, being less than ninety (90) degrees and wherein said arc shaped rows of keys being disposed in series with each other along said keyboard axis and within side edges of said display screen surface during use of said diagonal virtual keyboard;

said keyboard axis being disposed at an acute or obtuse angle relative to a user of said diagonal virtual keyboard and being generally aligned along a length of an arm of the user holding said device; and said diagonal keyboard scalable, during use of said device, proportionally in both height and width to maintain same aspect ratio.

2. A device comprising a processor executing a machine executable software code, a memory, a rectangular display screen with orthogonally disposed edges defining a quadrilateral shaped surface of said rectangular display screen and a diagonal virtual keyboard displayable on said rectangular display screen surface during use of said device, said diagonal virtual keyboard comprising:

arc shaped rows of virtual keys defining a keyboard axis, a keyboard diagonal and side borders of said diagonal virtual keyboard, a height of said diagonal virtual keyboard being different than a width thereof during use of said diagonal virtual keyboard;

said keyboard axis runs through a point formed, external to one side border of said device, by an intersection of first and second secondary axes, wherein one of said first and second secondary axes is disposed inwardly from and parallel to a respective side edge of said rectangular display screen;

said arc shaped rows of keys disposed in series with each other along said keyboard axis and within side borders of said rectangular display screen surface, wherein said side borders of said diagonal virtual keyboard do not extend beyond said side borders of said rectangular display screen surface during use of said diagonal virtual keyboard when said point having said keyboard axis therethrough is disposed external to said one side border of said device and wherein all alphabetical keys are displayed on said rectangular display screen surface; and said diagonal virtual keyboard scalable, during use of said device, proportionally in both height and width to maintain same aspect ratio.

3. A diagonal virtual keyboard configured to be displayed on a rectangular display screen surface, said diagonal virtual keyboard comprising:

arc shaped rows of virtual keys defining a keyboard axis, a keyboard diagonal and side borders of said diagonal virtual keyboard, said side borders defining a rectangular surface, said keyboard diagonal spanning a pair of opposite corners of said rectangular surface during use of said diagonal virtual keyboard;

said arc shaped rows of keys disposed in series with each other along said keyboard axis, wherein said side borders of said diagonal virtual keyboard do not extend beyond said side borders of said display screen surface during use of said diagonal virtual keyboard and wherein all alphabetical keys are displayed on said display screen surface;

a height of said diagonal virtual keyboard being different than a width and configured to be scalable, during use of said device, proportionally in both height and width to maintain same aspect ratio.

* * * * *